US012125451B2

(12) United States Patent
Hong et al.

(10) Patent No.: US 12,125,451 B2
(45) Date of Patent: Oct. 22, 2024

(54) DISPLAY DEVICE AND METHOD OF COMPENSATING FOR DEGRADATION OF DISPLAY DEVICE

(71) Applicant: Samsung Display Co., LTD., Yongin-si (KR)

(72) Inventors: Seokha Hong, Yongin-si (KR); Jong-Woong Park, Yongin-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 0 days.

(21) Appl. No.: 18/143,829

(22) Filed: May 5, 2023

(65) Prior Publication Data

US 2024/0135893 A1 Apr. 25, 2024
US 2024/0233664 A9 Jul. 11, 2024

(30) Foreign Application Priority Data

Oct. 25, 2022 (KR) ........................ 10-2022-0138626

(51) Int. Cl.
*G09G 3/36* (2006.01)
*G09G 3/3291* (2016.01)

(52) U.S. Cl.
CPC ......... *G09G 3/3607* (2013.01); *G09G 3/3291* (2013.01); *G09G 2320/0666* (2013.01); *G09G 2360/147* (2013.01)

(58) Field of Classification Search
CPC ............... G09G 3/3607; G09G 3/3291; G09G 2320/0666; G09G 2360/147
See application file for complete search history.

(56) References Cited

U.S. PATENT DOCUMENTS

2017/0124943 A1* 5/2017 Peana .................. G09G 3/3225
2019/0114458 A1* 4/2019 Cho ................... G06V 40/1306
2021/0201826 A1* 7/2021 Woo ..................... G09G 3/3233

FOREIGN PATENT DOCUMENTS

KR 102400840 B1 5/2022

* cited by examiner

*Primary Examiner* — Kenneth B Lee, Jr.
(74) *Attorney, Agent, or Firm* — CANTOR COLBURN LLP

(57) ABSTRACT

A method of compensating for degradation of a display device includes: determining a reference region including a part of a first display region and a second display region having pixel structures from each other; determining first stress data of first pixels based on a first average luminance value of the first pixels disposed on the part of the first display region; determining second stress data of second pixels based on a second average luminance value of the second pixels disposed on a central region of the second display region; determining third stress data of third pixels based on a third average luminance value of the third pixels disposed on an outer region of the second display region; compensating for degradation of the second pixels based on the first and second stress data, and compensating for degradation of the third pixels based on the first and third stress data.

20 Claims, 16 Drawing Sheets

FIG. 10

| | LR | SV |
|---|---|---|
| R | 0.9 | 0.78 |
| G | 0.7 | 1 |
| B | 0.8 | 0.88 |

DISPLAY DEVICE AND METHOD OF COMPENSATING FOR DEGRADATION OF DISPLAY DEVICE

This application claims priority to Korean Patent Application No. 10-2022-0138626, filed on Oct. 25, 2022 and all the benefits accruing therefrom under 35 U.S.C. § 119, the content of which in its entirety is herein incorporated by reference.

BACKGROUND

1. Field

Embodiments of the present invention relate to a display device and a method of compensating for degradation of the display device. More particularly, embodiments of the present invention relate to a display device including a display region having different pixel structures and a method of compensating for degradation of the display device.

2. Description of the Related Art

Generally, a display device may include a display panel, a timing controller, a gate driver, and a data driver. The display panel may include a plurality of gate lines, a plurality of data lines, and a plurality of pixels electrically connected to the gate lines and the data lines. The gate driver may provide gate signals to the gate lines. The data driver may provide data voltages to the data lines. The timing controller may control the gate driver and the data driver.

In the display device, as a driving time of each pixel increases, a light emitting element in the pixel tends to degrade, which may generally cause pixel luminance to decrease. To compensate for this pixel degradation, a technique that accumulates stress data about stress applied to each pixel and adjusts image data based on the accumulated stress data have been developed.

However, to apply this technique, a display device should include a nonvolatile memory device to retain the accumulated stress data even when the display device is powered off. Further, as a resolution of the display device increases, the display device should have larger-sized nonvolatile memory device. In particular, in case of a mobile device for which a small volume is required, the display device cannot have a large-sized nonvolatile memory device because of a limited space, and thus it is not easy to apply the technique that compensates for the pixel degradation by adjusting the image data based on the accumulated stress data.

SUMMARY

Embodiments of the present invention provide a display device that compensated for relative degradation.

Embodiments of the present invention also provide a method of compensating for degradation of the display device.

According to embodiments of the present invention, a method of compensating for degradation of a display device includes: determining a reference region including a part of a first display region and a second display region having a pixel structure different from a pixel structure of the first display region, determining first stress data of first pixels based on a first average luminance value of the first pixels disposed on the part of the first display region, determining second stress data of second pixels based on a second average luminance value of the second pixels disposed on a central region of the second display region, determining third stress data of third pixels based on a third average luminance value of the third pixels disposed on an outer region surrounding the central region of the second display region, compensating for degradation of the second pixels based on the first stress data and the second stress data, and compensating for degradation of the third pixels based on the first stress data and the third stress data.

In an embodiment, an optical module may be disposed under the second display region.

In an embodiment, the method may include assigning a first value to the first pixels, assigning a second value different from the first value to the second pixels, and assigning a third value different from the first value and the second value to the third pixels, and the first pixels, the second pixels, and the third pixels may be distinguished by assigned values.

In an embodiment, the first value, the second value, and the third value may be assigned as a bit flag.

In an embodiment, the first stress data may be determined based on a product of the first average luminance value and a first stress acceleration coefficient, the second stress data may be determined based on a product of the second average luminance value and a second stress acceleration coefficient different from the first stress acceleration coefficient, and the third stress data may be determined based on a product of the third average luminance value and a third stress acceleration coefficient different from the first stress acceleration coefficient.

In an embodiment, the method may include accumulating the first stress data to generate first accumulated stress data, accumulating the second stress data to generate second accumulated stress data, and accumulating the third stress data to generate third accumulated stress data, the degradation of the second pixels may be compensated based on the first accumulated stress data and the second accumulated stress data, and the degradation of the third pixels may be compensated based on the first accumulated stress data and the third accumulated stress data.

In an embodiment, the degradation of the second pixels may be compensated by a difference between the first accumulated stress data and the second accumulated stress data, and the degradation of the third pixels may be compensated by a difference between the first accumulated stress data and the third accumulated stress data.

In an embodiment, the first accumulated stress data, the second accumulated stress data, and the third accumulated stress data may be stored in a nonvolatile memory device.

In an embodiment, the degradation of the second pixels may be compensated by reducing luminance of the second pixels when the second accumulated stress data is less than the first accumulated stress data, and the degradation of the third pixels may be compensated by reducing luminance of the third pixels when the third accumulated stress data is less than the first accumulated stress data.

In an embodiment, determining the first stress data may include determining the first stress data for a first color based on the first average luminance value for the first color, determining the first stress data for a second color based on the first average luminance value for the second color, and determining the first stress data for a third color based on the first average luminance value for the third color, determining the second stress data may include determining the second stress data for the first color based on the second average luminance value for the first color, determining the second stress data for the second color based on the second average luminance value for the second color, and determining the second stress data for the third color based on the second average luminance value for the third color, and determining the third stress data may include determining the third stress data for the first color based on the third average luminance value for the first color, determining the third stress data for the second color based on the third average luminance value for the second color, and determining the third stress data for the third color based on the third average luminance value for the third color.

In an embodiment, compensating for the degradation of the second pixels may include compensating for degradation of first color sub-pixels, configured to display the first color, of the second pixels based on the first stress data for the first color and the second stress data for the first color, compensating for degradation of second color sub-pixels, configured to display the second color, of the second pixels based on the first stress data for the second color and the second stress data for the second color, and compensating for degradation of third color sub-pixels, configured to display the third color, of the second pixels based on the first stress data for the third color and the second stress data for the third color.

In an embodiment, compensating for the degradation of the third pixels may include compensating for degradation of first color sub-pixels, configured to display the first color, of the third pixels based on the first stress data for the first color and the third stress data for the first color, compensating for degradation of second color sub-pixels, configured to display the second color, of the third pixels based on the first stress data for the second color and the third stress data for the second color, and compensating for degradation of third color sub-pixels, configured to display the third color, of the third pixels based on the first stress data for the third color and the third stress data for the third color.

In an embodiment, the method may further include accumulating the first stress data for the first color to generate first accumulated stress data for the first color, accumulating the first stress data for the second color to generate the first accumulated stress data for the second color, accumulating the first stress data for the third color to generate the first accumulated stress data for the third color, determining a luminance maintenance ratio for the first color of the first pixels based on the first accumulated stress data for the first color, determining the luminance maintenance ratio for the second color of the first pixels based on the first accumulated stress data for the second color, determining the luminance maintenance ratio for the third color of the first pixels based on the first accumulated stress data for the third color, and compensating for a difference in degradation between the first color, the second color, and the third color in the first display region and the second display region based on the luminance maintenance ratio for the first color, the luminance maintenance ratio for the second color, and the luminance maintenance ratio for the third color.

In an embodiment, compensating for the difference in the degradation between the first color, the second color, and the third color may include determining a reference color among the first color, the second color, and the third color, and applying scale values determined based on the luminance maintenance ratio for the reference color to colors other than the reference color.

In an embodiment, the reference color may be determined as a color having a smallest luminance maintenance ratio among the first color, the second color, and the third color.

In an embodiment, each of the scale values may be calculated by dividing the luminance maintenance ratio for the reference color by the luminance maintenance ratio for each of the colors other than the reference color.

According to embodiments of the present invention, a method of compensating for degradation of a display device includes: determining a reference region including a part of a first display region and a second display region having a pixel structure different from a pixel structure of the first display region; determining first stress data of first pixels based on a first average luminance value of the first pixels disposed on the part of the first display region; determining second stress data of second pixels based on a second average luminance value of the second pixels disposed on a central region of the second display region; determining 3-1st stress data of 3-1st pixels based on a 3-1st average luminance value of the 3-1st pixels disposed on an first outer region of an outer region surrounding the central region of the second display region; determining 3-2th stress data of 3-2th pixels based on a 3-2th average luminance value of the 3-2th pixels disposed on an second outer region of the outer region of the second display region, where the second outer region is different from the first outer region; compensating for degradation of the second pixels based on the first stress data and the second stress data; compensating for degradation of the 3-1st pixels based on the first stress data and the 3-1st stress data; and compensating for degradation of the 3-2th pixels based on the first stress data and the 3-2th stress data.

In an embodiment, the method may further include assigning a first value to the first pixels, assigning a second value different from the first value to the second pixels, assigning a third value different from the first value and the second value to the 3-1st pixels, and assigning a fourth value different from the first value, the second value, and the third value to the 3-2th pixels, and the first pixels, the second pixels, the 3-1st pixels, and the 3-2th pixels may be distinguished by assigned values.

In an embodiment, the method may further include accumulating the first stress data to generate first accumulated stress data, accumulating the second stress data to generate second accumulated stress data, accumulating the 3-1st stress data to generate 3-1st accumulated stress data, and accumulating the 3-2th stress data to generate 3-2th accumulated stress data, the degradation of the second pixels may be compensated based on the first accumulated stress data and the second accumulated stress data, the degradation of the 3-1st pixels may be compensated based on the first accumulated stress data and the 3-1st accumulated stress data, and the degradation of the 3-2th pixels may be compensated based on the first accumulated stress data and the 3-2th accumulated stress data.

According to embodiment of the present invention a display device includes: a display panel including pixels, a data driver configured to provide data voltages to the pixels, a gate driver configured to provide gate signals to the pixels, and a timing controller configured to control the data driver and the gate driver. The timing controller is configured to determine first stress data of first pixels based on a first average luminance value of the first pixels disposed on a part of the first display region included in a reference region, to determine second stress data of second pixels based on a second average luminance value of the second pixels disposed on a central region of a second display region, to determine third stress data of third pixels based on a third average luminance value of the third pixels disposed on an outer region surrounding the central region of the second display region, to compensate for degradation of the second pixels based on the first stress data and the second stress data, and to compensate for degradation of the third pixels based on the first stress data and the third stress data. The second display region has a pixel structure different from a pixel structure of the first display region and is included in the reference region.

Therefore, the method may compensate for relative degradation of a second display region with respect to a first display region. Accordingly, display quality of the display device may be effectively enhanced.

In addition, the method may use a small-sized nonvolatile memory device by compensating for degradation based on stress data of a reference region.

Further, the method may use a small-sized nonvolatile memory device by reducing a size of accumulated stress data used for calculation.

And, the method may compensate for a difference in degradation between colors based on accumulated stress data of first pixels. Accordingly, color deviation of the display device may be compensated.

However, the effects of the present invention are not limited to the above-described effects, and may be variously expanded without departing from the spirit and scope of the present invention.

BRIEF DESCRIPTION OF THE DRAWINGS

FIG. 10 is a table showing a luminance maintenance ratio and a scale value according to the method of FIG. 1.

DETAILED DESCRIPTION

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. As used herein, "a", "an," "the," and "at least one" do not denote a limitation of quantity, and are intended to include both the singular and plural, unless the context clearly indicates otherwise. For example, "an element" has the same meaning as "at least one element," unless the context clearly indicates otherwise. "At least one" is not to be construed as limiting "a" or "an." "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof. Hereinafter, the present invention will be explained in detail with reference to the accompanying drawings.

Figure 1:
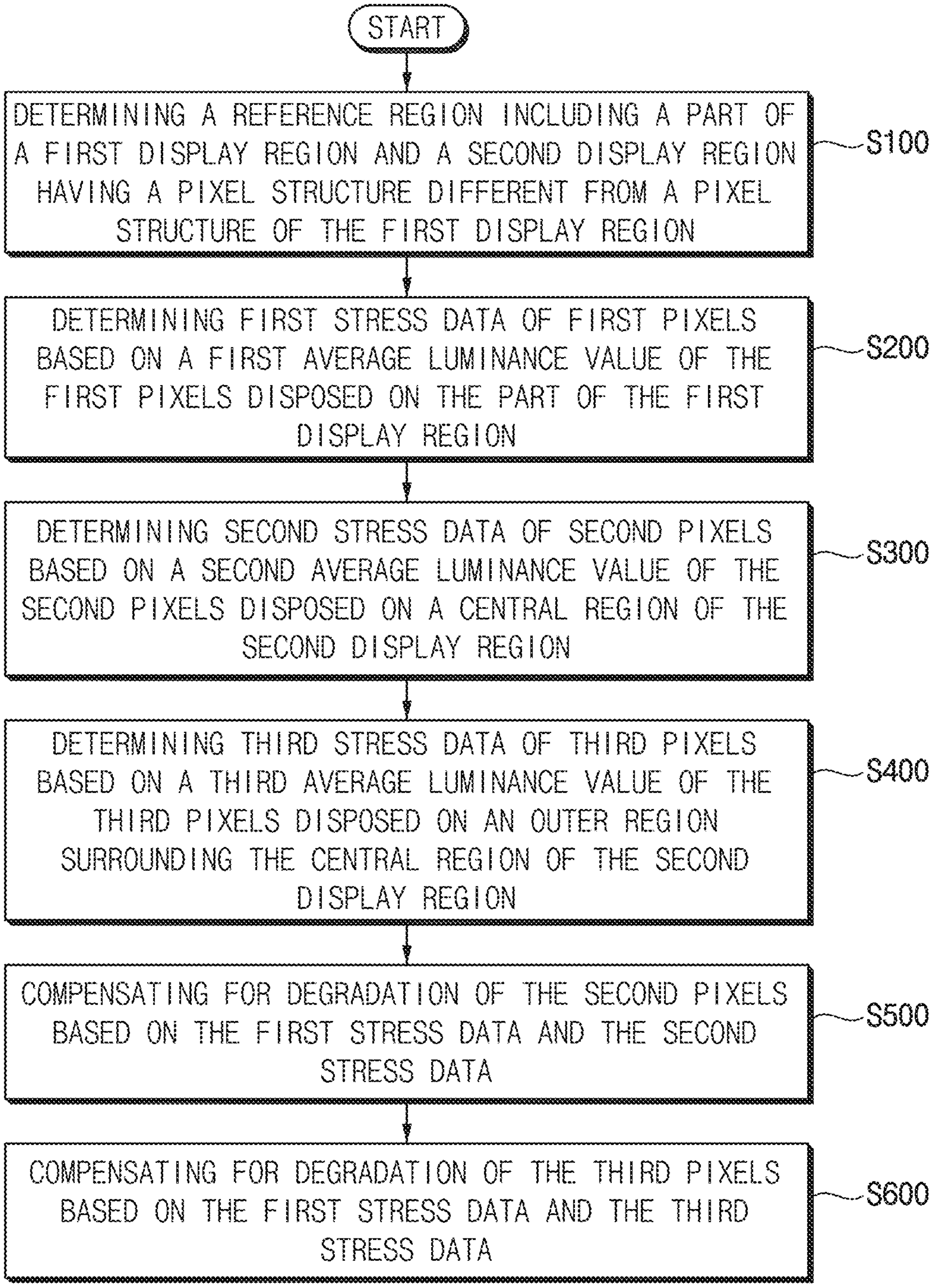
FIG. 1 is a flowchart illustrating a method of compensating for degradation of a display device according to embodiments of the present invention.

FIG. 1 is a flowchart illustrating a method of compensating for degradation of a display device according to embodiments of the present invention.

Referring to FIG. 1, the method of FIG. 1 may include: determining a reference region including a part of a first display region and a second display region having a pixel structure different from a pixel structure of the first display region (in other words, determining a reference region including a second display region and a part of a first display region having a pixel structure different from a pixel structure of the second display region) (S100), determining first stress data of first pixels based on a first average luminance value of the first pixels disposed on the part of the first display region (S200), determining second stress data of second pixels based on a second average luminance value of the second pixels disposed on a central region of the second display region (S300), determining third stress data of third pixels based on a third average luminance value of the third pixels disposed on an outer region of the second display region, surrounding the central region (S400), compensating for degradation of the second pixels based on the first stress data and the second stress data (S500), and compensating for degradation of the third pixels based on the first stress data and the third stress data (S600).

Hereinafter, it will be described in detail with reference to FIGS. 2 to 8.

Figure 2:
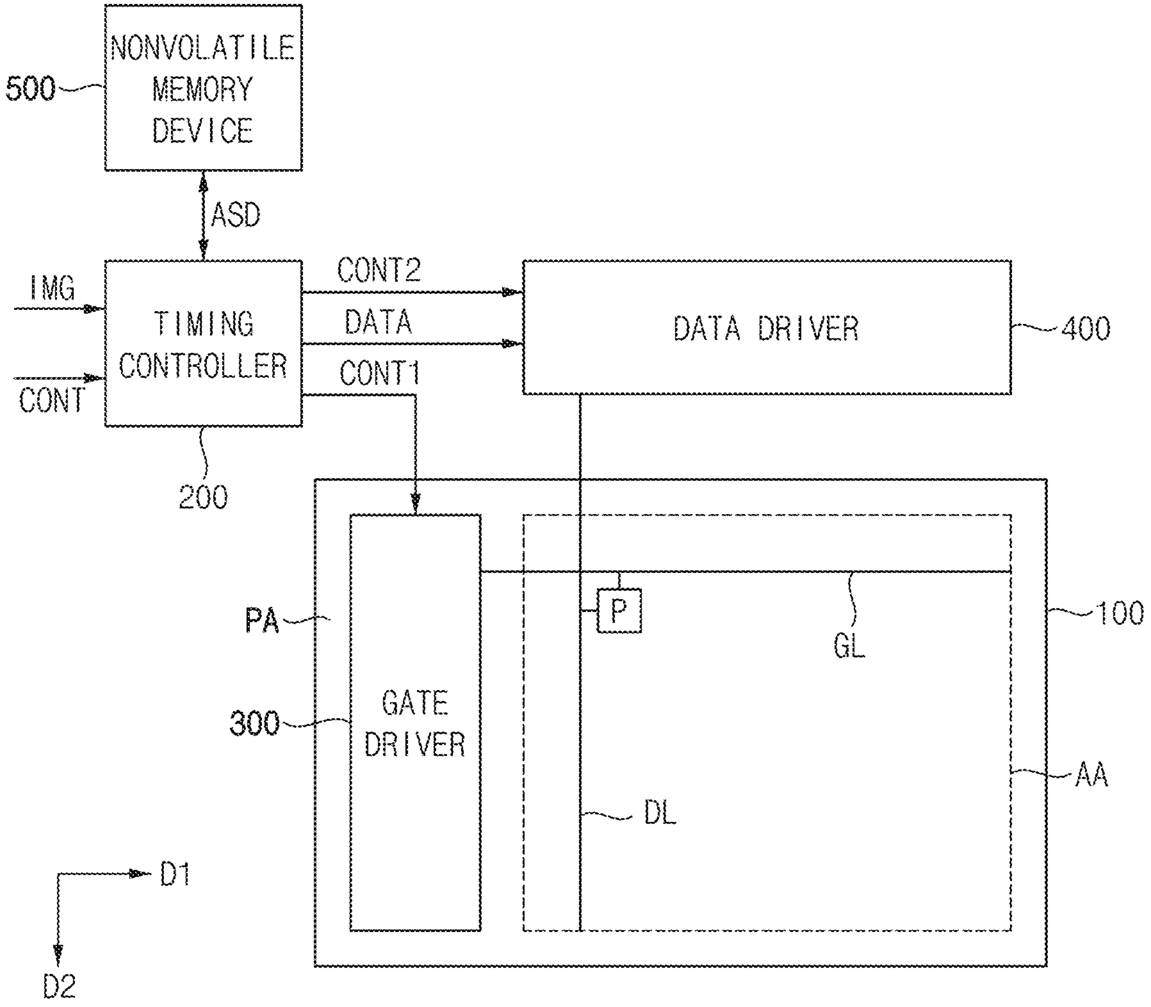
FIG. 2 is a block diagram illustrating an example of a display device according to the method of FIG. 1.

FIG. 2 is a block diagram illustrating an example of a display device according to the method of FIG. 1.

Referring to FIG. 2, the display device may include a display panel 100, a timing controller 200, a gate driver 300, a data driver 400, and a nonvolatile memory device 500. In an embodiment, the timing controller 200 and the data driver 400 may be integrated into one chip.

The display panel 100 has a display region AA on which an image is displayed and a peripheral region PA adjacent to the display region AA. In an embodiment, the gate driver 300 may be mounted on the peripheral region PA of the display panel 100.

The display panel 100 may include a plurality of gate lines GL, a plurality of data lines DL, and a plurality of pixels P electrically connected to the data lines DL and the gate lines GL. The gate lines GL may extend in a first direction D1 and the data lines DL may extend in a second direction D2 crossing the first direction D1.

The timing controller 200 may receive input image data IMG and an input control signal CONT from a host processor (e.g., a graphic processing unit; "GPU"). For example, the input image data IMG may include red image data, green image data and blue image data. In an embodiment, the input image data IMG may further include white image data. For another example, the input image data IMG may include magenta image data, yellow image data, and cyan image data. The input control signal CONT may include a master clock signal and a data enable signal. The input control signal CONT may further include a vertical synchronizing signal and a horizontal synchronizing signal.

The timing controller 200 may generate a first control signal CONT1, a second control signal CONT2, data signal DATA, and accumulated stress data ASD based on the input image data IMG and the input control signal CONT.

The timing controller 200 may generate the first control signal CONT1 for controlling operation of the gate driver 300 based on the input control signal CONT and output the first control signal CONT1 to the gate driver 300. The first control signal CONT1 may include a vertical start signal and a gate clock signal.

The timing controller 200 may generate the second control signal CONT2 for controlling operation of the data driver 400 based on the input control signal CONT and output the second control signal CONT2 to the data driver 400. The second control signal CONT2 may include a horizontal start signal and a load signal.

The timing controller 200 may receive the input image data IMG and the input control signal CONT, and generate the data signal DATA. The timing controller 200 may output the data signal DATA to the data driver 400.

The timing controller 200 may accumulate stress data of the input image data IMG to generate the accumulated stress data ASD. The timing controller 200 may receive the accumulated stress data ASD from the nonvolatile memory device 500 and accumulate the stress data into the accumulated stress data ASD. The timing controller 200 may store the accumulated stress data ASD in the nonvolatile memory device 500.

The gate driver 300 may generate gate signals for driving the gate lines GL in response to the first control signal CONT1 input from the timing controller 200. The gate driver 300 may output the gate signals to the gate lines GL. For example, the gate driver 300 may sequentially output the gate signals to the gate lines GL.

The data driver 400 may receive the second control signal CONT2 and the data signal DATA from the timing controller 200. The data driver 400 may convert the data signal DATA into data voltages having an analog type. The data driver 400 may output the data voltages to the data lines DL.

In this embodiment, the nonvolatile memory device 500 is illustrated as being outside the timing controller 200, but the present invention is not limited thereto. For example, the nonvolatile memory device 500 may be disposed inside the timing controller 200.

Figure 3:
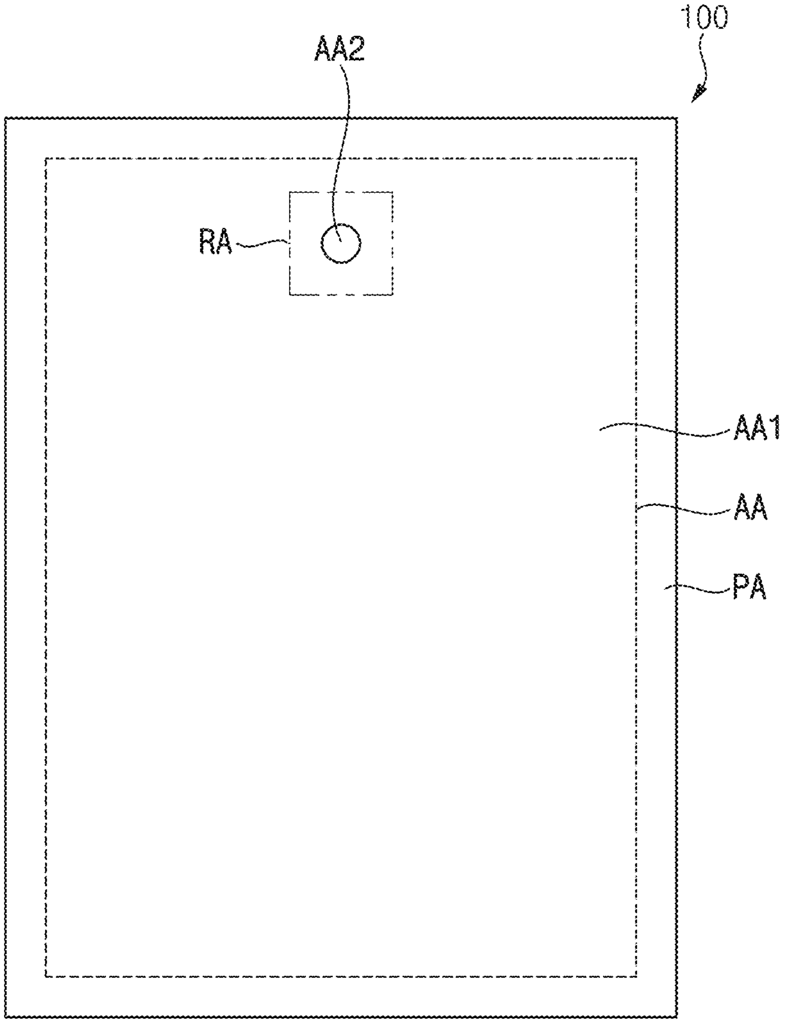
FIG. 3 is a plan view illustrating an example of the display panel of FIG. 2.
Figure 4:
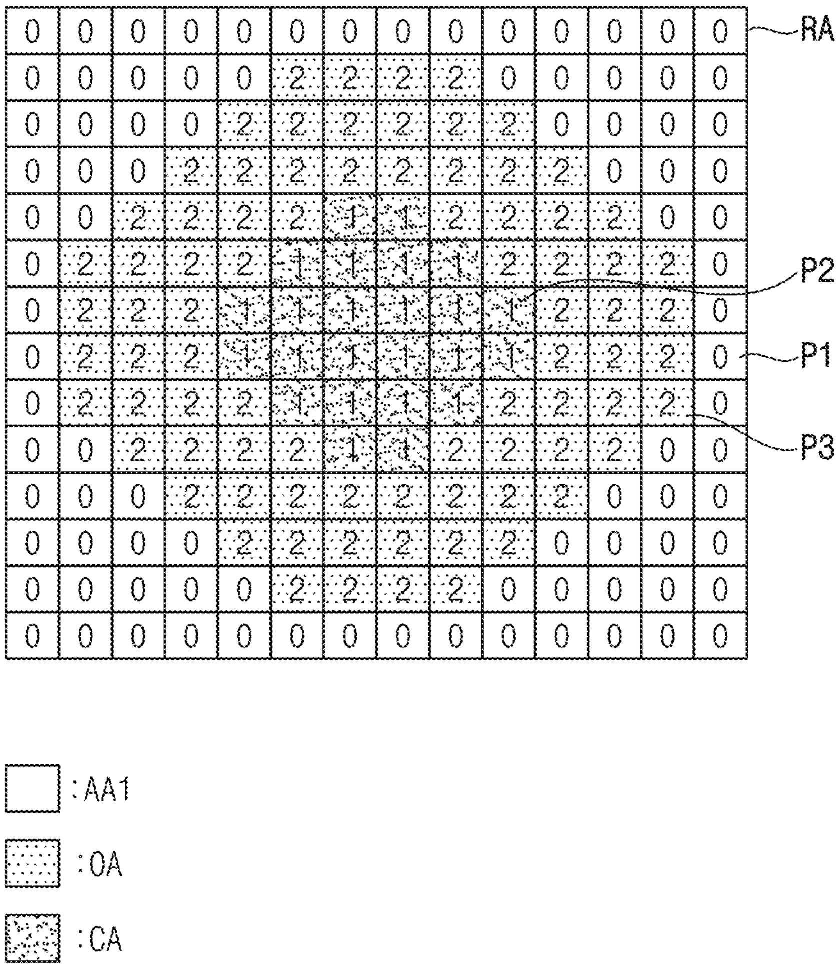
FIG. 4 is a diagram illustrating an example of a reference region of FIG. 3.

FIG. 3 is a plan view illustrating an example of the display panel 100 of FIG. 2, and FIG. 4 is a diagram illustrating an example of a reference region RA of FIG. 3. Here, the plan view is a view in a direction perpendicular to the first direction DR1 and the second direction DR2.

Referring to FIG. 3, the display panel 100 may include a first display region AA1 having a first pixel structure and a second display region AA2 having a second pixel structure different from the first pixel structure. In an embodiment, an optical module may be disposed under the second display region AA2 in a plan view. The optical module may be a module using optics. For example, the optical module may include a camera module, an iris recognition module, an optical fingerprint recognition module, an infrared module, and the like.

The pixels P may be disposed in the first display region AA1 and the second display region AA2. However, the first display region AA1 and the second display region AA2 may have different pixel structures from each other. In the case of the second display region AA2, since the optical module takes a picture, a transmission window may be disposed between the pixels P. For example, the number of pixels per unit area of the second pixel structure may be smaller than the number of pixels per unit area of the first pixel structure.

Referring to FIGS. 1, 2, and 4, the method of FIG. 1 may include determining the reference region RA including the part of the first display region AA1 and the second display region AA2 having a pixel structure different from a pixel structure of the first display region AA1 (S100). The part of the first display region AA1 may surround the second display region AA2 and a region of the reference region RA except for the second display region AA2.

The method of FIG. 1 may include assigning a first value to the first pixels, assigning a second value different from the first value to the second pixels, and assigning a third value different from the first value and the second value to the third pixels. For example, as shown in FIG. 4, the first value may be 0, the second value may be 1, and the third value may be 2.

The first value, the second value, and the third value may be assigned as a bit flag. However, the method of assigning values to the pixels P according to the present invention is not limited thereto.

The first pixels P1 may be pixels P disposed on the first display region AA1 in the reference region RA. The second pixels P2 may be pixels P disposed on the central region CA of the second display region AA2. The third pixels P3 may be pixels P disposed on the outer region OA of the second display region AA2. The outer region OA may surround the central region CA. In FIG. 4, one square box represents one pixel P.

The first pixels, the second pixels, and the third pixels may be distinguished by assigned values. That is, the timing controller 200 may determine positions of the pixels P in the reference region RA by the assigned values.

Figure 5:
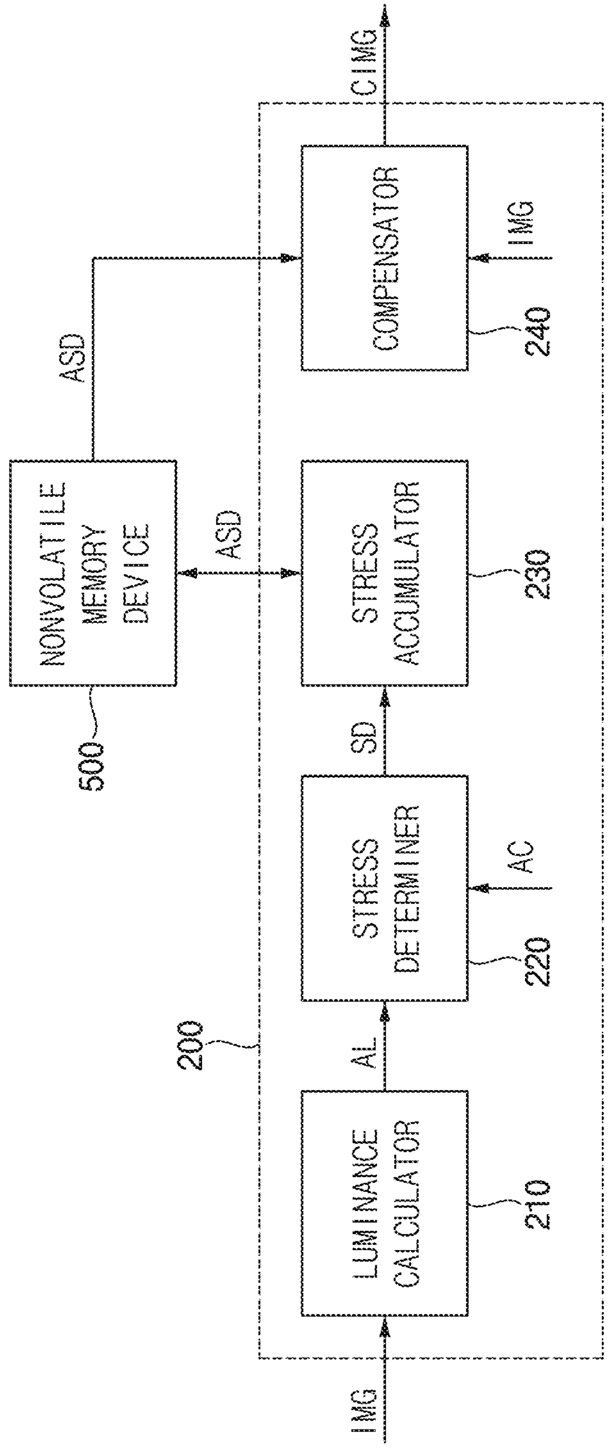
FIG. 5 is a block diagram illustrating an example of a timing controller of FIG. 2.
Figure 6:
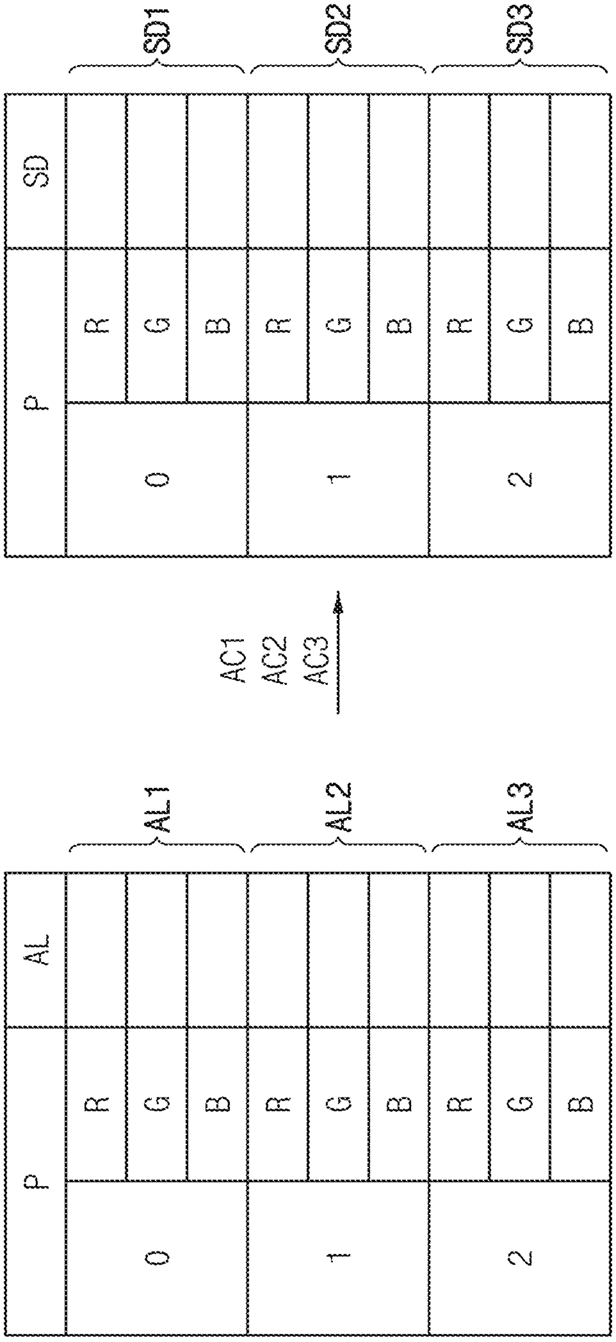
FIG. 6 is a diagram illustrating an example in which stress data is determined according to the method of FIG. 1.
Figure 7:
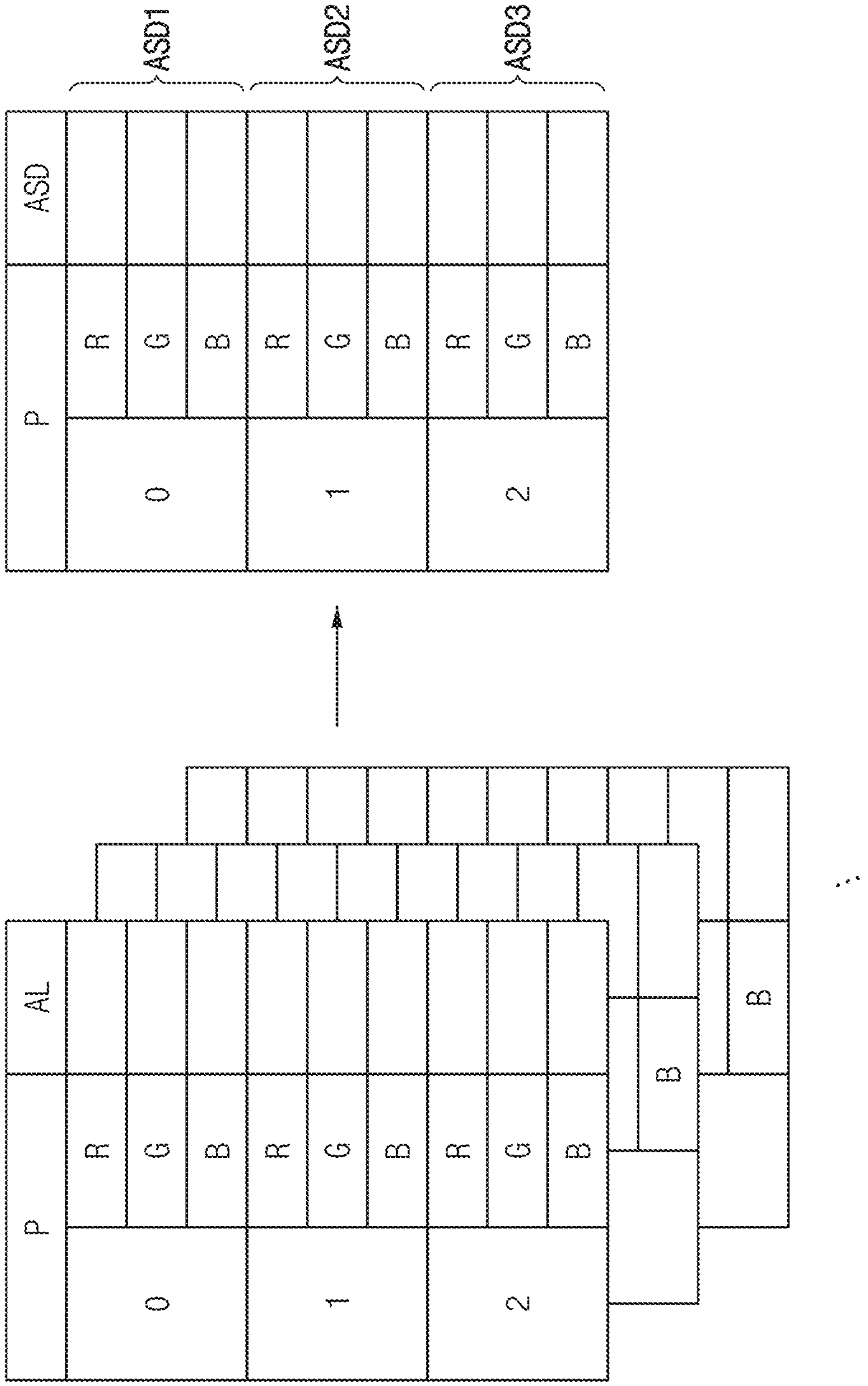
FIG. 7 is a diagram illustrating an example of generating accumulated stress data according to the method of FIG. 1.
Figure 8:
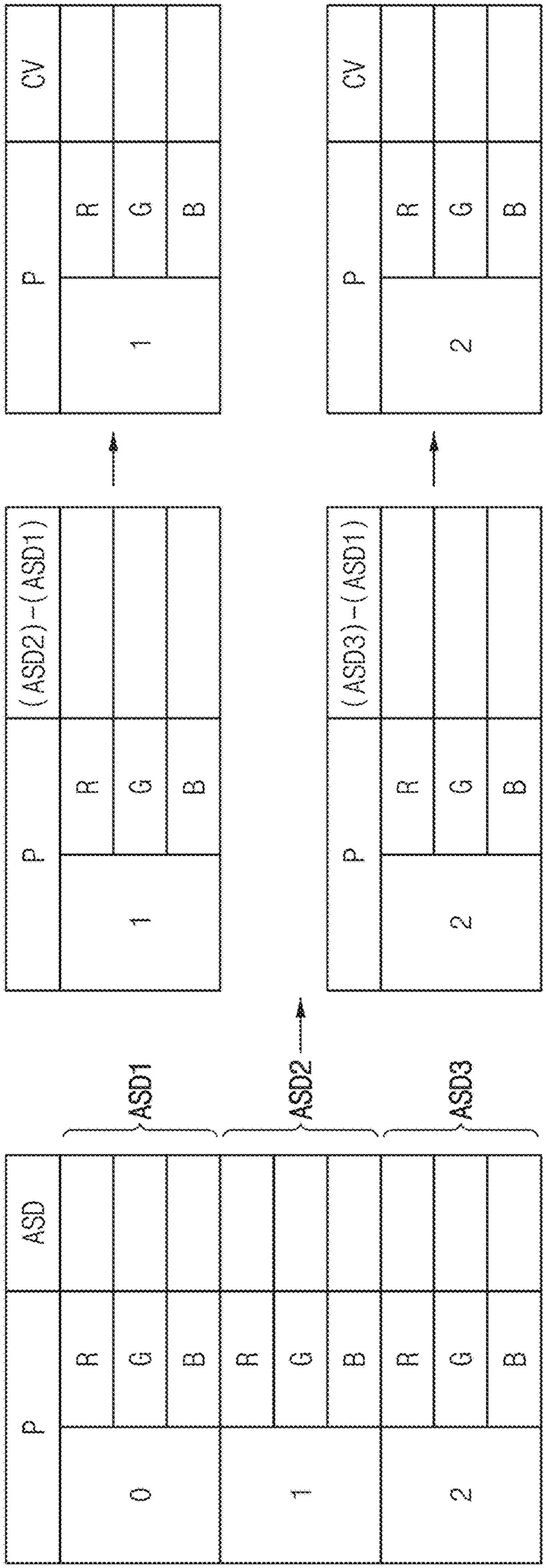
FIG. 8 is a diagram illustrating an example of determining a compensation value according to the method of FIG. 1.

FIG. 5 is a block diagram illustrating an example of a timing controller 200 of FIG. 2, FIG. 6 is a diagram illustrating an example in which stress data SD is determined according to the method of FIG. 1, FIG. 7 is a diagram illustrating an example of generating the accumulated stress data ASD according to the method of FIG. 1, and FIG. 8 is a diagram illustrating an example of determining a compensation value CV according to the method of FIG. 1.

In FIGS. 6 to 8, 0 indicates pixels P to which the first value is assigned (i.e., the first pixels), 1 indicates pixels P to which a second value is assigned (i.e., the second pixels), and 2 indicates pixels P to which the third value is assigned (i.e., the third pixels).

Referring to FIGS. 1, 2, and 4 to 6, the method of FIG. 1 may include: determining the first stress data SD1 of the first pixels based on a first average luminance value AL1 of the first pixels disposed on the part of the first display region AA1 (S200), determining second stress data SD2 of the second pixels based on a second average luminance value AL2 of the second pixels disposed on the central region CA of the second display region AA2 (S300), and determining third stress data SD3 of the third pixels based on a third average luminance value AL3 of the third pixels disposed on the outer region OA surrounding the central region CA of the second display region AA2 (S400).

The timing controller 200 may include a luminance calculator 210, a stress determiner 220, a stress accumulator 230, and a compensator 240.

The luminance calculator 210 may receive the input image data IMG. The luminance calculator 210 may determine luminance values of the pixels P in the reference region RA based on the input image data IMG. That is, the luminance calculator 210 may calculate luminance displayed by the pixels P in the reference region RA based on the input image data IMG.

The luminance calculator 210 may calculate an average luminance value AL by calculating an average value of the calculated luminance values.

For example, the luminance calculator 210 may calculate the first average luminance value AL1 of the first pixels. For example, the luminance calculator 210 may sum the luminance values of pixels P to which the first value is assigned among the calculated luminance values, and divide the sum by the number of pixels to which the first value is assigned.

For example, the luminance calculator 210 may calculate the second average luminance value AL2 of the second pixels. For example, the luminance calculator 210 may sum the luminance values of pixels P to which the second value is assigned among the calculated luminance values, and divide the sum by the number of pixels to which the second value is assigned.

For example, the luminance calculator 210 may calculate the third average luminance value AL3 of the third pixels. For example, the luminance calculator 210 may sum the luminance values of pixels P to which the third value is assigned among the calculated luminance values, and divide the sum by the number of pixels to which the third value is assigned.

The luminance calculator 210 may determine luminance values for each of colors R, G, and B, and calculate the average luminance values AL for each of the colors R, G, and B. The colors R, G, and B may be colors displayed by the pixels P. The colors R, G, and B may include a first color R, a second color G, and a third color B. For example, the first color R may be red, the second color G may be green, and the third color B may be blue.

For example, the luminance calculator 210 may calculate the first average luminance value AL1 for the first color R based on the luminance values for the first color R of the first pixels P1. The luminance calculator 210 may calculate the first average luminance value AL1 for the second color G based on the luminance values for the second color G of the first pixels P1. The luminance calculator 210 may calculate the first average luminance value AL1 for the third color B based on the luminance values for the third color B of the first pixels P1.

For example, the luminance calculator 210 may calculate the second average luminance value AL2 for the first color R based on the luminance values for the first color R of the second pixels P2. The luminance calculator 210 may calculate the second average luminance value AL2 for the second color G based on the luminance values for the second color G of the second pixels P2. The luminance calculator 210 may calculate the second average luminance value AL2 for the third color B based on the luminance values for the third color B of the second pixels P2.

For example, the luminance calculator 210 may calculate the third average luminance value AL3 for the first color R based on the luminance values for the first color R of the third pixels P3. The luminance calculator 210 may calculate the third average luminance value AL3 for the second color G based on the luminance values for the second color G of the third pixels P3. The luminance calculator 210 may calculate the third average luminance value AL3 for the third color B based on the luminance values for the third color B of the third pixels P3.

The stress determiner 220 may receive the average luminance values AL. The stress determiner 220 may determine the stress data SD based on the average luminance values AL.

For example, the stress determiner 220 may determine the first stress data SD1 of the first pixels based on the first average luminance value AL1 of the first pixels disposed on the part of the first display region AA1. For example, the stress determiner 220 may determine the first stress data SD1 for the first color R based on the first average luminance value AL1 for the first color R. For example, the stress determiner 220 may determine the first stress data SD1 for the second color G based on the first average luminance value AL1 for the second color G. For example, the stress determiner 220 may determine the first stress data SD1 for the third color B based on the first average luminance value AL1 for the third color B.

For example, the stress determiner 220 may determine the second stress data SD2 of the second pixels based on the second average luminance value AL2 of the second pixels disposed on the central region CA of the second display region AA2. For example, the stress determiner 220 may determine the second stress data SD2 for the first color R based on the second average luminance value AL2 for the first color R. For example, the stress determiner 220 may determine the second stress data SD2 for the second color G based on the second average luminance value AL2 for the second color G. For example, the stress determiner 220 may determine the second stress data SD2 for the third color B based on the second average luminance value AL2 for the third color B.

For example, the stress determiner 220 may determine the third stress data SD3 of the third pixels based on the third average luminance value AL3 of the third pixels disposed on the outer region OA of the second display region AA2. For example, the stress determiner 220 may determine the third stress data SD3 for the first color R based on the third average luminance value AL3 for the first color R. For example, the stress determiner 220 may determine the third stress data SD3 for the second color G based on the third average luminance value AL3 for the second color G. For example, the stress determiner 220 may determine the third stress data SD3 for the third color B based on the third average luminance value AL3 for the third color B.

The stress data SD may increase as the average luminance values AL are increases. For example, the first stress data SD1 may increase as the first average luminance value AL1 increases. For example, the second stress data SD2 may increase as the second average luminance value AL2 increases. For example, the third stress data SD3 may increase as the third average luminance value AL3 increases.

According to an embodiment, the stress determiner 220 may calculate the stress data Based on load information, temperature information, and information on stress level according to each grayscale value, etc. as well as the average luminance value AL.

In an embodiment, the stress determiner 220 may determine the stress data SD based on a product of the average luminance values AL and the stress acceleration coefficients AC.

For example, the first stress data SD1 may be determined based on a product of the first average luminance value AL1 and the first stress acceleration coefficient AC1. For example, the first stress data SD1 may increase as the product of the first average luminance value AL1 and the first stress acceleration coefficient AC1 increases.

For example, the second stress data SD2 may be determined based on a product of the second average luminance value AL2 and a second stress acceleration coefficient AC2 different from the first stress acceleration coefficient AC1. For example, the second stress data SD2 may increase as the product of the second average luminance value AL2 and the second stress acceleration coefficient AC2 increase.

For example, the third stress data SD3 may be determined based on a product of the third average luminance value AL3 and a third stress acceleration coefficient AC3 different from the first stress acceleration coefficient AC1. For example, the third stress data SD3 may increase as the product of the third average luminance value AL3 and the third stress acceleration coefficient AC3 increases.

The first display region AA1 and the second display region AA2 may have different pixel structures from each other. That is, the degree of degradation of the first pixels and the degree of degradation of the second and third pixels may be different for the same luminance. Accordingly, stress acceleration coefficients (i.e., the second stress acceleration coefficient AC2 and the third stress acceleration coefficient AC3) different from the stress acceleration coefficients (i.e., the first stress acceleration coefficient AC1) of the first pixels P1 may be applied to the second and third pixels P2 and P3.

Referring to FIGS. 1, 2, 4, 5, and 7, the stress accumulator 230 may accumulate the stress data SD to generate the accumulated stress data ASD. The stress accumulator 230 may generate the accumulated stress data ASD and store the accumulated stress data ASD in the nonvolatile memory device 500.

The stress accumulator 230 may receive new stress data SD and accumulate the new stress data SD to the stress data SD previously stored in the nonvolatile memory device 500. Accordingly, the accumulated stress data ASD may indicate the degree of degradation of the pixels P.

For example, the stress accumulator 230 may accumulate the first stress data SD1 to generate the first accumulated stress data ASD1. For example, the stress accumulator 230 may accumulate the first stress data SD1 for the first color R to generate the first accumulated stress data ASD1 for the first color R. For example, the stress accumulator 230 may accumulate the first stress data SD1 for the second color G to generate the first accumulated stress data ASD1 for the second color G. For example, the stress accumulator 230 may accumulate the first stress data SD1 for the third color B to generate the first accumulated stress data ASD1 for the third color B.

For example, the stress accumulator 230 may accumulate the second stress data SD2 to generate the second accumulated stress data ASD2. For example, the stress accumulator 230 may accumulate the second stress data SD2 for the first color R to generate the second accumulated stress data ASD2 for the first color R. For example, the stress accumulator 230 may accumulate the second stress data SD2 for the second color G to generate the second accumulated stress data ASD2 for the second color G. For example, the stress accumulator 230 may accumulate the second stress data SD2 for the third color B to generate the second accumulated stress data ASD2 for the third color B.

For example, the stress accumulator 230 may accumulate the third stress data SD3 to generate the third accumulated stress data ASD3. For example, the stress accumulator 230 may accumulate the third stress data SD3 for the first color R to generate the third accumulated stress data ASD3 for the first color R. For example, the stress accumulator 230 may accumulate the third stress data SD3 for the second color G to generate the third accumulated stress data ASD3 for the second color G. For example, the stress accumulator 230 may accumulate the third stress data SD3 for the third color B to generate the third accumulated stress data ASD3 for the third color B.

In this embodiment, the stress accumulator 230 is illustrated as being inside the timing controller 200, but the present invention is not limited thereto.

Referring to FIGS. 1, 2, 4, 5, and 8, the method of FIG. 1 may include" compensating for the degradation of the second pixels based on the first stress data SD1 and the second stress data SD2 (S500), and compensating for the degradation of the third pixels based on the first stress data SD1 and the third stress data SD3 (S600).

The compensator 240 may compensate for the degradation of the second pixels and the third pixels based on the accumulated stress data ASD. The compensator 240 may generate compensated image data CIMG by compensating the input image data IMG. The timing controller 200 may generate the data signal DATA based on the compensated image data CIMG.

The compensator 240 may compensate for the degradation of the second pixels based on the first accumulated stress data ASD1 and the second accumulated stress data ASD2. The degradation of the second pixels may be compensated by a difference between the first accumulated stress data ASD1 and the second accumulated stress data ASD2.

The compensator 240 may determine the compensation value CV for the second pixels based on a difference between the first accumulated stress data ASD1 and the second accumulated stress data ASD2. The compensation value CV for the second pixels may increase as a value obtained by subtracting the first accumulated stress data ASD1 from the second accumulated stress data ASD2 increases.

The compensator 240 may generate the compensated image data CIMG by applying the compensation value CV for the second pixels to the input image data IMG corresponding to the second pixels.

For example, when the second accumulated stress data ASD2 is greater than the first accumulated stress data ASD1, the compensation value CV for the second pixels may be a positive number. In this case, the degradation of the second pixels may be compensated by increasing luminance of the second pixels. For example, when the second accumulated stress data ASD2 is less than the first accumulated stress data ASD1, the compensation value CV for the second pixels may be a negative number. In this case, the degradation of the second pixels may be compensated by reducing the luminance of the second pixels.

The compensator 240 may compensate for the degradation of the third pixels based on the first accumulated stress data ASD1 and the third accumulated stress data ASD3. The degradation of the third pixels may be compensated by a difference between the first accumulated stress data ASD1 and the third accumulated stress data ASD3.

The compensator 240 may determine the compensation value CV for the third pixels based on a difference between the first accumulated stress data ASD1 and the third accumulated stress data ASD3. The compensation value CV for the third pixels may increase as a value obtained by subtracting the first accumulated stress data ASD1 from the third accumulated stress data ASD3 increases.

The compensator 240 may generate the compensated image data CIMG by applying the compensation value CV for the third pixels to the input image data IMG corresponding to the third pixels.

For example, when the third accumulated stress data ASD3 is greater than the first accumulated stress data ASD1, the compensation value CV for the third pixels may be a positive number. In this case, the degradation of the third pixels may be compensated by increasing luminance of the third pixels. For example, when the third accumulated stress data ASD3 is less than the first accumulated stress data ASD1, the compensation value CV for the third pixels may be a negative number. In this case, the degradation of the third pixels may be compensated by reducing the luminance of the third pixels.

Accordingly, the method of FIG. 1 may compensate for the relative degradation of the second display region AA2 compared to the first display region AA1.

Each of the second pixels may include a first color sub-pixel displaying the first color R, a second color sub-pixel displaying the second color G, and a third color sub-pixel displaying the third color B. Each of the third pixels may include a first color sub-pixel displaying the first color R, a second color sub-pixel displaying the second color G, and a third color sub-pixel displaying the third color B.

The compensator 240 may individually compensate for each of the first color sub-pixel, the second color sub-pixel, and the third color sub-pixel.

For example, the compensator 240 may compensate for the degradation of the first color sub-pixels displaying the first color R of the second pixels based on the first stress data SD1 for the first color R and the second stress data SD2 for the first color R. For example, the compensator 240 may compensate for the degradation of the second color sub-pixels displaying the second color G of the second pixels based on the first stress data SD1 for the second color G and the second stress data SD2 for the second color G. For example, the compensator 240 may compensate for the degradation of the third color sub-pixels displaying the third color B of the second pixels based on the first stress data SD1 for the third color B and the second stress data SD2 for the third color B.

For example, the compensator 240 may compensate for the degradation of the first color sub-pixels displaying the first color R of the third pixels based on the first stress data SD1 for the first color R and the third stress data SD3 for the first color R. For example, the compensator 240 may compensate for the degradation of the second color sub-pixels displaying the second color G of the third pixels based on the first stress data SD1 for the second color G and the third stress data SD3 for the second color G. For example, the compensator 240 may compensate for the degradation of the third color sub-pixels displaying the third color B of the third pixels based on the first stress data SD1 for the third color B and the third stress data SD3 for the third color B.

Figure 9:
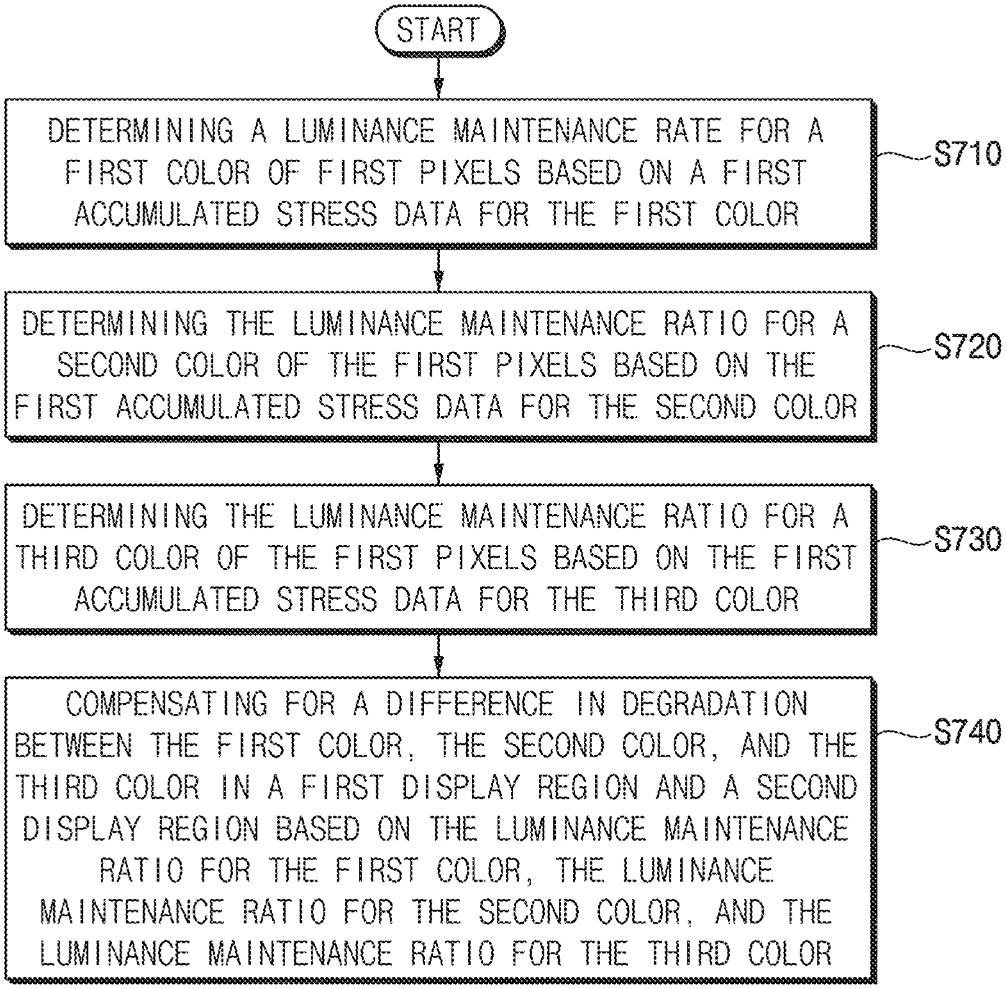
FIG. 9 is a flowchart illustrating compensation of a difference in degradation between colors according to the method of FIG. 1.

FIG. 9 is a flowchart illustrating compensation of a difference in degradation between colors R, G, and B according to the method of FIG. 1, and FIG. 10 is a table showing a luminance maintenance ratio LR and a scale value SV according to the method of FIG. 1.

Referring to FIGS. 2, 5, 9, and 10, the method of FIG. 1 may include: determining the luminance maintenance ratio LR for the first color R of the first pixels based on the first accumulated stress data ASD1 for the first color R (S710), determining the luminance maintenance ratio LR for the second color G of the first pixels based on the first accumulated stress data ASD1 for the second color G (S720), determining the luminance maintenance ratio LR for the third color B of the first pixels based on the first accumulated stress data ASD1 for the third color B (S730), and compensating for a difference in degradation between the first color R, the second color G, and the third color B in the first display region AA1 and the second display region AA2 based on the luminance maintenance ratio LR for the first color R, the luminance maintenance ratio LR for the second color G, and the luminance maintenance ratio LR for the third color B (S740).

The luminance maintenance ratio LR may represent a decrease in luminance compared to initial luminance due to degradation of the pixels P. For example, when luminance decreases by 10% due to degradation, the luminance maintenance ratio LR may be 0.9.

The luminance of each of the colors R, G, and B may be compensated by the applied scale values SV. For example, when a scale value SV of 0.78 is applied to a specific color, the luminance of the specific color may be reduced to 78%.

The timing controller 200 may compensate for the difference in the degradation between the first color R, the second color G, and the third color B in the first display region AA1 and the second display region AA2 based on the luminance maintenance ratio LR for the first color R, the luminance maintenance ratio LR for the second color G, and the luminance maintenance ratio LR for the third color B.

That is, the timing controller 200 may compensate for the difference in the degradation between the colors R, G, and B. Also, the timing controller 200 may compensate for color distortion due to degradation of the entire display panel 100 using only the accumulated stress data ASD of the first display region AA1 in the reference region RA. As the accumulated stress of a specific display region is great, the degradation of the specific display region is also great.

The timing controller 200 may determine a reference color among the first color R, the second color G, and the third color B. The timing controller 200 may apply the scale values SV determined based on the luminance maintenance ratio LR for the reference color to colors other than the reference color.

In an embodiment, the reference color may be determined as a color having the smallest luminance maintenance ratio LR among the first color R, the second color G, and the third color B. For example, as shown in FIG. 10, when the luminance maintenance ratio LR for the first color R is 0.9, the luminance maintenance ratio LR for the second color G is 0.7, and the luminance maintenance ratio LR for the third color B is 0.8, the reference color may be the second color G.

In this embodiment, it is exemplified that the reference color is determined as the color having the smallest luminance maintenance ratio LR, but the present invention is not limited thereto.

Each of the scale values SV may be calculated by dividing the luminance maintenance ratio LR for the reference color by the luminance maintenance ratio LR for each color other than the reference color. For example, as shown in FIG. 10, when the luminance maintenance ratio LR for the second color G determined as the reference color is 0.7 and the luminance maintenance ratio LR for the first color R is 0.9, the scale value SV for the first color R may be about 0.78 (0.7/0.9=about 0.78). For example, as shown in FIG. 10, when the luminance maintenance ratio LR for the second color G determined as the reference color is 0.7 and the luminance maintenance ratio LR for the third color B is 0.8, the scale value SV for the third color B may be about 0.88 (0.7/0.8=about 0.88).

In this embodiment, simple division calculation is exemplified, but the present invention is not limited thereto.

Figure 11:
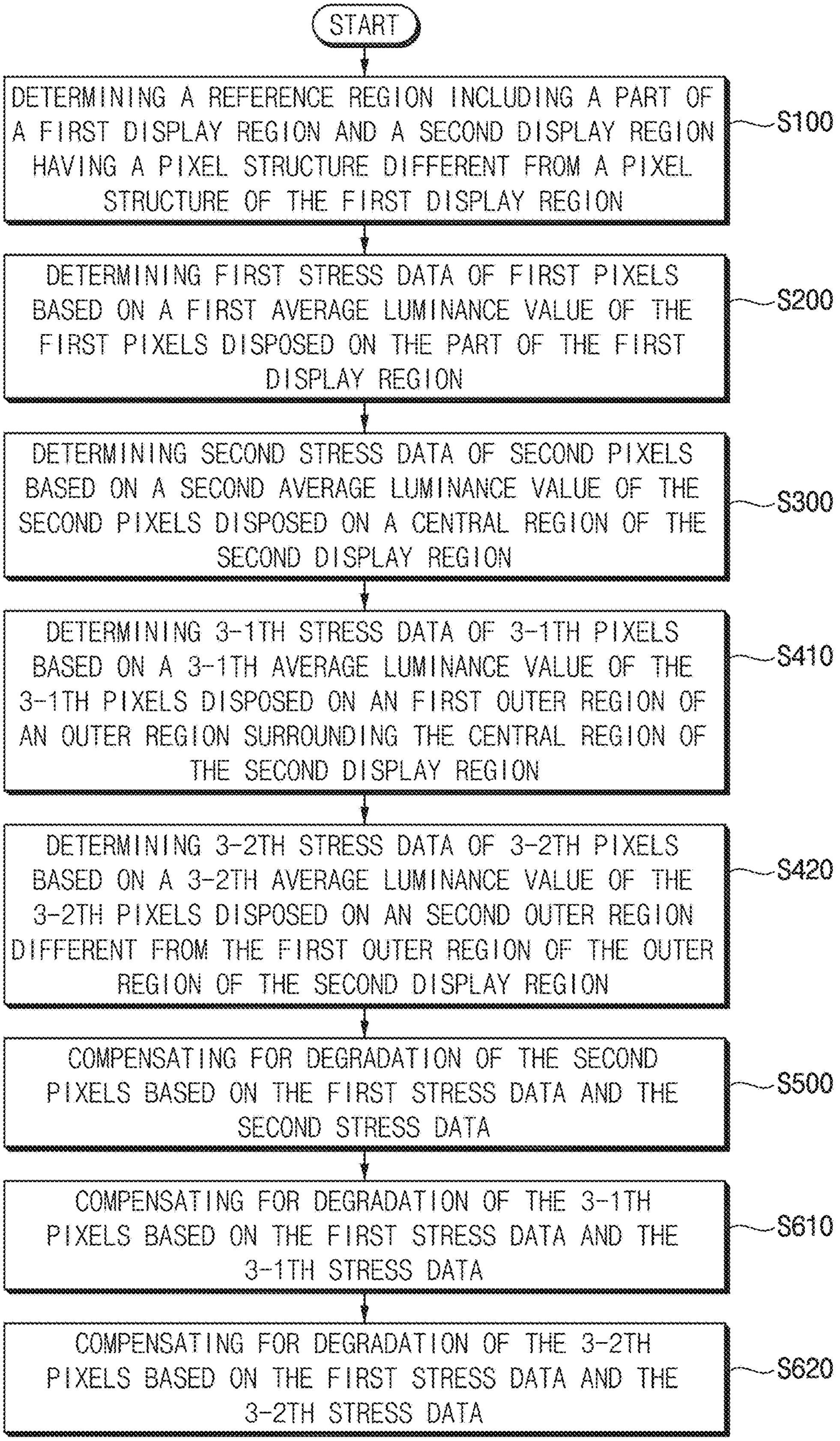
FIG. 11 is a flowchart illustrating a method of compensating for degradation of a display device according to embodiments of the present invention.

FIG. 11 is a flowchart illustrating a method of compensating for degradation of a display device according to embodiments of the present invention.

The display device according to the present embodiment is substantially the same as the display device of FIG. 1 except for compensating for the input image data IMG after the initial driving. Thus, the same reference numerals are used to refer to the same or similar element, and any repetitive explanation will be omitted.

The method of compensating for the display device according to the present embodiment is substantially the same as the method of FIG. 1 except for compensating by dividing the outer region into a first outer region and a second outer region. Thus, the same reference numerals are used to refer to the same or similar element, and any repetitive explanation will be omitted.

Referring to FIGS. 11, the method of FIG. 11 may include determining the reference region including the part of the first display region and the second display region having the pixel structure different from the pixel structure of the first display region (S100), determining the first stress data of the first pixels based on the first average luminance value of the first pixels disposed on the part of the first display region (S200), determining the second stress data of the second pixels based on the second average luminance value of the second pixels disposed on the central region of the second display region (S300), determining 3-1st stress data of 3-1st pixels based on a 3-1st average luminance value of the 3-1st pixels disposed on the first outer region of the outer region, where the outer region surrounds the central region of the second display region (S410), determining 3-2th stress data of 3-2th pixels based on a 3-2th average luminance value of the 3-2th pixels disposed on an second outer region different from the first outer region of the outer region of the second display region (S420), compensating for the degradation of the second pixels based on the first stress data and the second stress data (S500), compensating for degradation of the 3-1st pixels based on the first stress data and the 3-1st stress data (S610), and compensating for degradation of the 3-2th pixels based on the first stress data and the 3-2th stress data (S620).

Hereinafter, it will be described in detail with reference to FIGS. 12 to 15.

Figure 12:
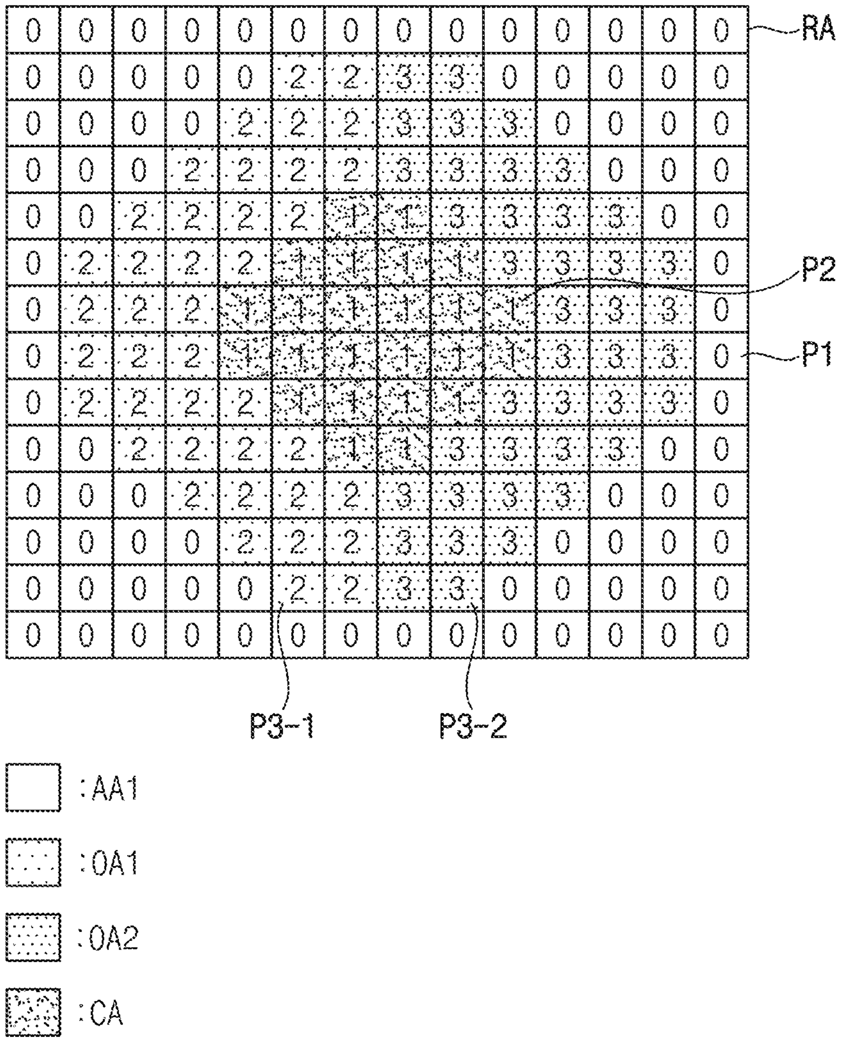
FIG. 12 is a diagram illustrating an example of a reference region according to the method of FIG. 11.

FIG. 12 is a diagram illustrating an example of the reference region RA according to the method of FIG. 11.

Referring to FIG. 12, the outer region of the second display region AA2 may be divided into the first outer region OA1 and the second outer region OA2. For example, the outer region may be divided into the first outer region OA1 and the second outer region OA2 based on a middle line of the second display region AA2.

In this embodiment, it is exemplified that the first outer region OA1 and the second outer region OA2 are divided based on the middle line of the second display region AA2, but the present invention is not limited thereto.

The method of FIG. 11 may include assigning a first value to the first pixels, assigning a second value different from the first value to the second pixels, assigning a third value different from the first value and the second value to the 3-1st pixels P3-1, and assigning a fourth value different from the first value, the second value, and the third value to the 3-2th pixels P3-2. For example, as shown in FIG. 12, the first value may be 0, the second value may be 1, the third value may be 2, and the fourth value may be 3.

Figure 13:
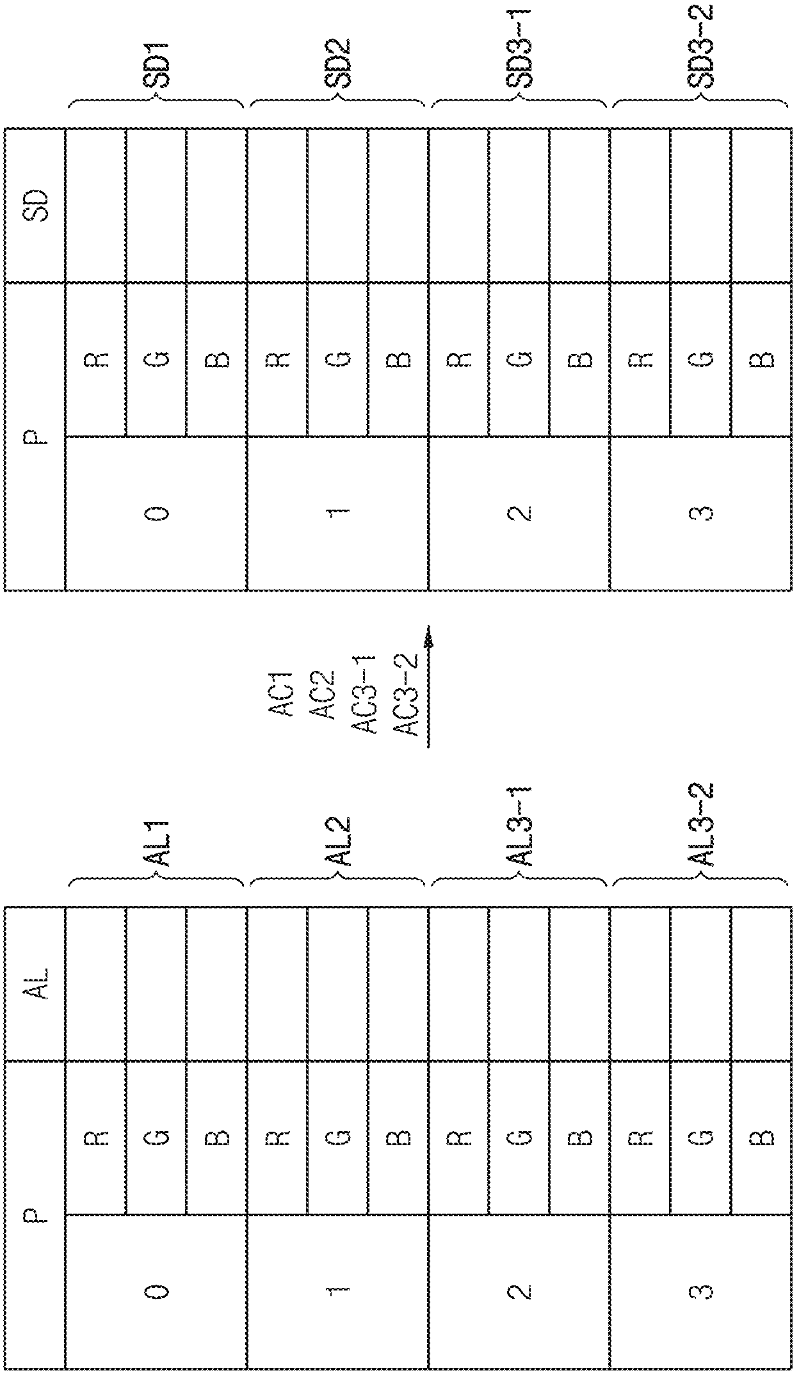
FIG. 13 is a diagram illustrating an example of determining stress data according to the method of FIG. 11.
Figure 14:
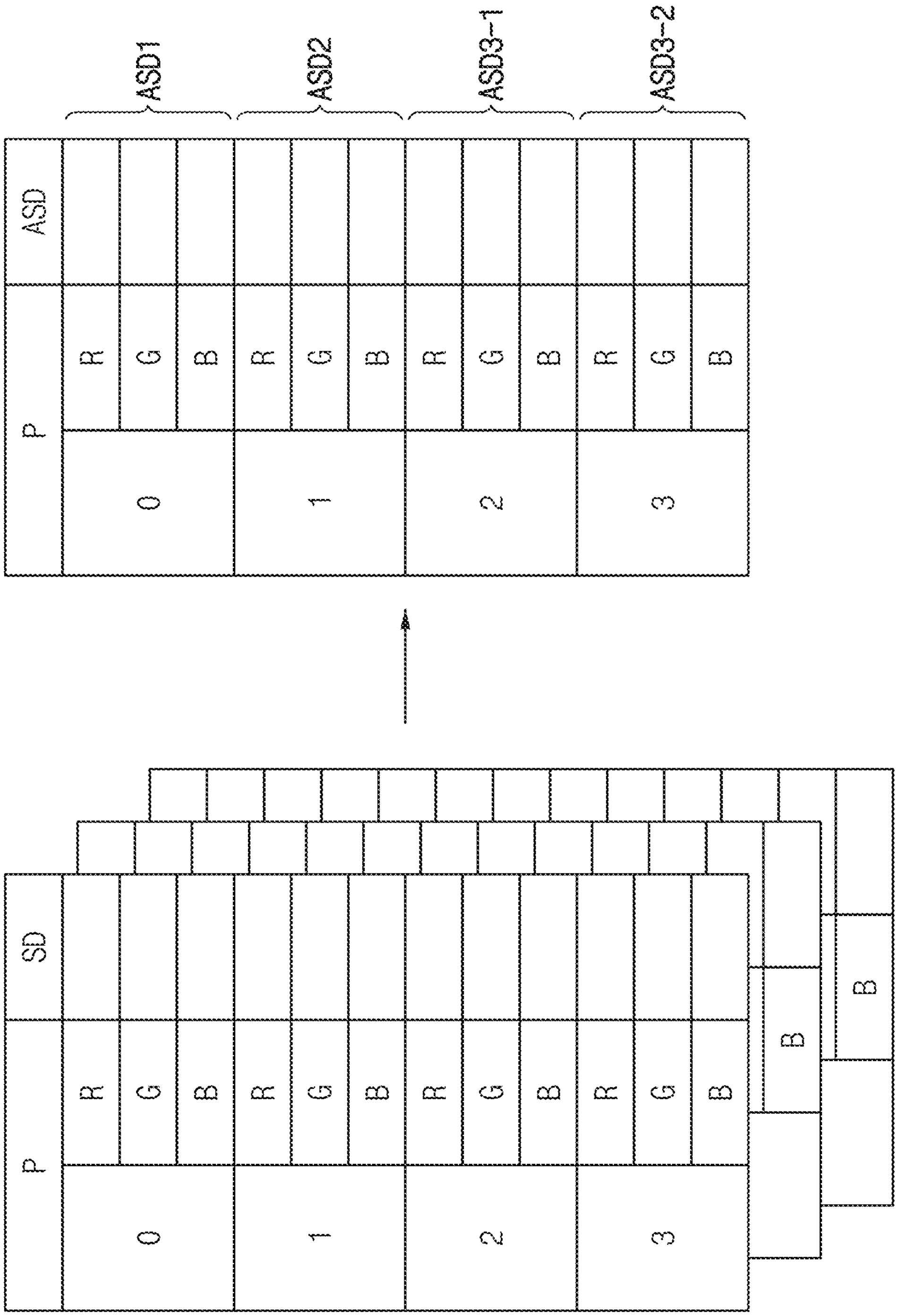
FIG. 14 is a diagram illustrating an example of generating accumulated stress data according to the method of FIG. 11.
Figure 15:
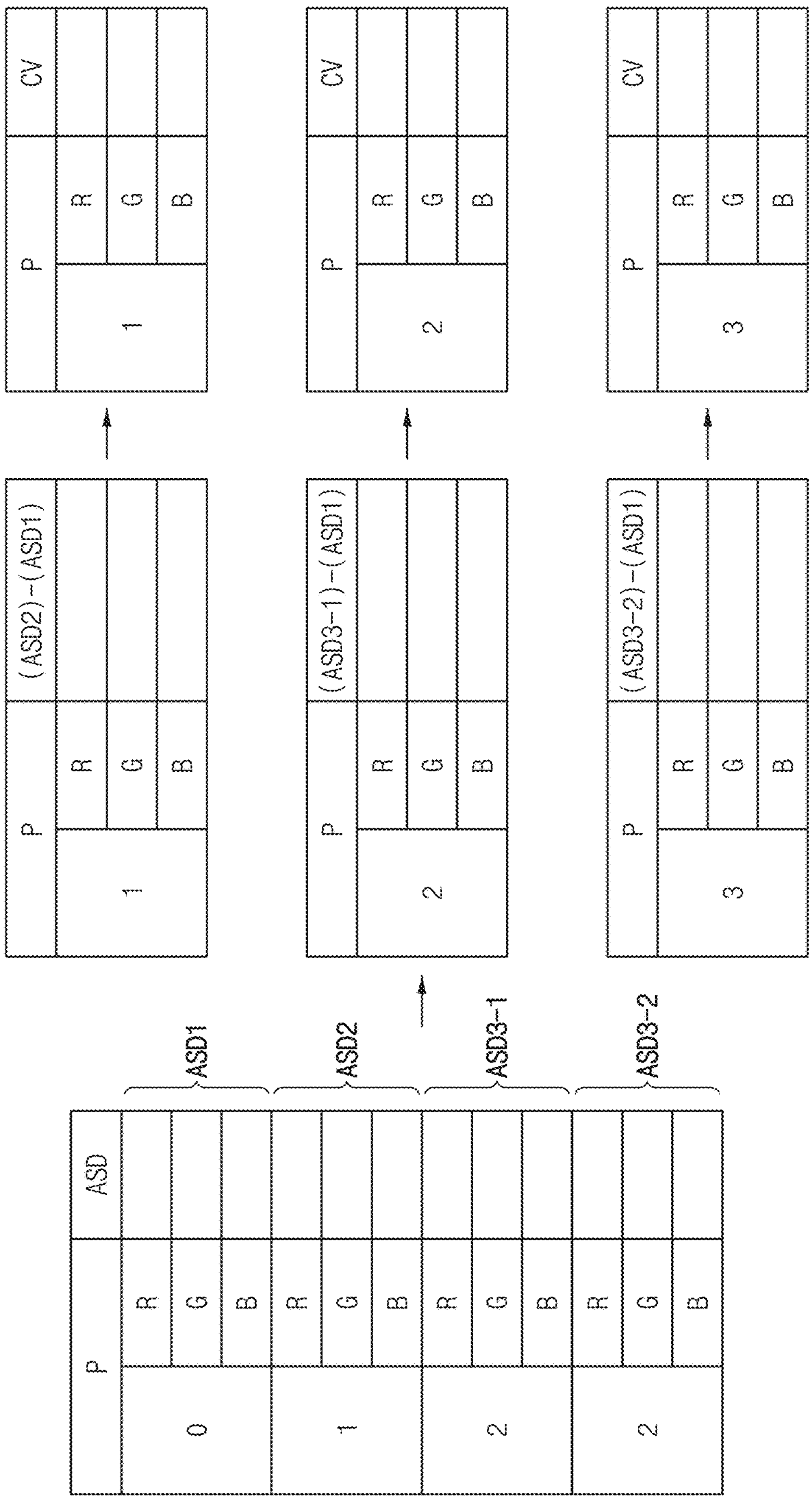
FIG. 15 is a diagram illustrating an example of determining a compensation value according to the method of FIG. 11.

FIG. 13 is a diagram illustrating an example of determining the stress data SD according to the method of FIG. 11, FIG. 14 is a diagram illustrating an example of generating the accumulated stress data ASD according to the method of FIG. 11, and FIG. 15 is a diagram illustrating an example of determining the compensation value CV according to the method of FIG. 11.

In FIGS. 13 to 15, 0 indicates pixels P to which the first value is assigned (i.e., the first pixels P1), 1 indicates pixels P to which a second value is assigned (i.e., the second pixels P2), 2 indicates pixels P to which the third value is assigned (i.e., the 3-1st pixels P3-1), and 3 indicates pixels P to which the fourth value is assigned (i.e., the 3-2th pixels P3-2).

Referring to FIGS. 2, 5, and 11 to 13, the luminance calculator 210 may calculate an average luminance value AL by calculating an average of the calculated luminance values.

For example, the luminance calculator 210 may calculate the 3-1st average luminance value AL3-1 of the 3-1st pixels P3-1. For example, the luminance calculator 210 may sum the luminance values of pixels P to which the third value is assigned among the calculated luminance values, and divide the sum by the number of pixels to which the third value is assigned.

For example, the luminance calculator 210 may calculate the 3-2th average luminance value AL3-2 of the 3-2th pixels P3-2. For example, the luminance calculator 210 may sum the luminance values of pixels P to which the fourth value is assigned among the calculated luminance values, and divide the sum by the number of pixels to which the third value is assigned.

The luminance calculator 210 may determine luminance values for each of colors R, G, and B, and calculate the average luminance values AL for each of the colors R, G, and B. The colors R, G, and B may be colors displayed by the pixels P.

For example, the luminance calculator 210 may calculate the 3-1st average luminance value AL3-1 for the first color R based on the luminance values for the first color R of the 3-1st pixels. The luminance calculator 210 may calculate the 3-1st average luminance value AL3-1 for the second color G based on the luminance values for the second color G of the 3-1st pixels. The luminance calculator 210 may calculate the 3-1st average luminance value AL3-1 for the third color B based on the luminance values for the third color B of the 3-1st pixels.

For example, the luminance calculator 210 may calculate the 3-2th average luminance value AL3-2 for the first color R based on the luminance values for the first color R of the 3-2th pixels. The luminance calculator 210 may calculate the 3-2th average luminance value AL3-2 for the second color G based on the luminance values for the second color G of the 3-2th pixels. The luminance calculator 210 may calculate the 3-2th average luminance value AL3-2 for the third color B based on the luminance values for the third color B of the 3-2th pixels.

The stress determiner 220 may receive the average luminance values AL. The stress determiner 220 may determine the stress data SD based on the average luminance values AL.

For example, the stress determiner 220 may determine the 3-1st stress data SD3-1 of the 3-1st pixels based on the 3-1st average luminance value AL3-1 of the 3-1st pixels disposed on the first outer region OA1 of the second display region AA2. For example, the stress determiner 220 may determine the 3-1st stress data SD3-1 for the first color R based on the 3-1st average luminance value AL3-1 for the first color R. For example, the stress determiner 220 may determine the 3-1st stress data SD3-1 for the second color G based on the 3-1st average luminance value AL3-1 for the second color G. For example, the stress determiner 220 may determine the 3-1st stress data SD3-1 for the third color B based on the 3-1st average luminance value AL3-1 for the third color B.

For example, the stress determiner 220 may determine the 3-2th stress data SD3-2 of the 3-2th pixels based on the 3-2th average luminance value AL3-2 of the 3-2th pixels disposed on the second outer region OA2 of the second display region AA2. For example, the stress determiner 220 may determine the 3-2th stress data SD3-2 for the first color R based on the 3-2th average luminance value AL3-2 for the first color R. For example, the stress determiner 220 may determine the 3-2th stress data SD3-2 for the second color G based on the 3-2th average luminance value AL3-2 for the second color G. For example, the stress determiner 220 may determine the 3-2th stress data SD3-2 for the third color B based on the 3-2th average luminance value AL3-2 for the third color B.

In an embodiment, the stress determiner 220 may determine the stress data SD based on a product of the average luminance values AL and the stress acceleration coefficients AC.

For example, the 3-1st stress data SD3 may be determined based on a product of the 3-1st average luminance value AL3-1 and a 3-1st stress acceleration coefficient AC3-1 different from the first stress acceleration coefficient AC1. For example, the 3-1st stress data SD3-1 may increase as the product of the 3-1st average luminance value AL3-1 and the 3-1st stress acceleration coefficient AC3-1 increases.

For example, the 3-2th stress data SD3 may be determined based on a product of the 3-2th average luminance value AL3-2 and a 3-2th stress acceleration coefficient AC3-2 different from the first stress acceleration coefficient AC1. For example, the 3-2th stress data SD3-2 may increase as the product of the 3-2th average luminance value AL3-2 and the 3-2th stress acceleration coefficient AC3-2 increases.

Referring to FIGS. 2, 5, 11, 12, and 14, the stress accumulator 230 may accumulate the stress data SD to generate the accumulated stress data ASD. The stress accumulator 230 may generate the accumulated stress data ASD and store the accumulated stress data in the nonvolatile memory device 500.

For example, the stress accumulator 230 may accumulate the 3-1st stress data SD3-1 to generate the 3-1st accumulated stress data ASD3-1. For example, the stress accumulator 230 may accumulate the 3-1st stress data SD3-1 for the first color R to generate the 3-1st accumulated stress data ASD3-1 for the first color R. For example, the stress accumulator 230 may accumulate the 3-1st stress data SD3-1 for the second color G to generate the 3-1st accumulated stress data ASD3-1 for the second color G. For example, the stress accumulator 230 may accumulate the 3-1st stress data SD3-1 for the third color B to generate the 3-1st accumulated stress data ASD3-1 for the third color B.

For example, the stress accumulator 230 may accumulate the 3-2th stress data SD3-2 to generate the 3-2th accumulated stress data ASD3-2. For example, the stress accumulator 230 may accumulate the 3-2th stress data SD3-2 for the first color R to generate the 3-2th accumulated stress data ASD3-2 for the first color R. For example, the stress accumulator 230 may accumulate the 3-2th stress data SD3-1 for the second color G to generate the 3-2th accumulated stress data ASD3-2 for the second color G. For example, the stress accumulator 230 may accumulate the 3-2th stress data SD3-2 for the third color B to generate the 3-2th accumulated stress data ASD3-2 for the third color B.

Referring to FIGS. 2, 5, 11, 12, and 15, the compensator 240 may compensate for the degradation of the second pixels and the third pixels based on the accumulated stress data ASD.

The compensator 240 may compensate for the degradation of the 3-1st pixels based on the first accumulated stress data ASD1 and the 3-1st accumulated stress data ASD3-1. The degradation of the 3-1st pixels may be compensated by a difference between the first accumulated stress data ASD1 and the 3-1st accumulated stress data ASD3-1.

The compensator 240 may determine the compensation value CV for the 3-1st pixels based on a difference between the first accumulated stress data ASD1 and the 3-1st accumulated stress data ASD3-1. The compensation value CV for the 3-1st pixels may increase as a value obtained by subtracting the first accumulated stress data ASD1 from the 3-1st accumulated stress data ASD3-1 increases.

The compensator 240 may generate the compensated image data CIMG by applying the compensation value CV for the 3-1st pixels to the input image data IMG corresponding to the 3-1st pixels.

For example, when the 3-1st accumulated stress data ASD3-1 is greater than the first accumulated stress data ASD1, the compensation value CV for the 3-1st pixels may be a positive number. In this case, the degradation of the 3-1st pixels may be compensated by increasing luminance of the 3-1st pixels. For example, when the 3-1st accumulated stress data ASD3-1 is less than the first accumulated stress data ASD1, the compensation value CV for the 3-1st pixels may be a negative number. In this case, the degradation of the 3-1st pixels may be compensated by reducing the luminance of the 3-1st pixels.

The compensator 240 may compensate for the degradation of the 3-2th pixels based on the first accumulated stress data ASD1 and the 3-2th accumulated stress data ASD3-2. The degradation of the 3-2th pixels may be compensated by a difference between the first accumulated stress data ASD1 and the 3-2th accumulated stress data ASD3-2.

The compensator 240 may determine the compensation value CV for the 3-2th pixels based on a difference between the first accumulated stress data ASD1 and the 3-2th accumulated stress data ASD3-2. The compensation value CV for the 3-2th pixels may increase as a value obtained by subtracting the first accumulated stress data ASD1 from the 3-2th accumulated stress data ASD3-2 increases.

The compensator 240 may generate the compensated image data CIMG by applying the compensation value CV for the 3-2th pixels to the input image data IMG corresponding to the 3-2th pixels.

For example, when the 3-2th accumulated stress data ASD3-2 is greater than the first accumulated stress data ASD1, the compensation value CV for the 3-2th pixels may be a positive number. In this case, the degradation of the 3-2th pixels may be compensated by increasing luminance of the 3-2th pixels. For example, when the 3-2th accumulated stress data ASD3-2 is less than the first accumulated stress data ASD1, the compensation value CV for the 3-2th pixels may be a negative number. In this case, the degradation of the 3-2th pixels may be compensated by reducing the luminance of the 3-2th pixels.

The compensator 240 may individually compensate for each of the first color sub-pixel, the second color sub-pixel, and the third color sub-pixel.

For example, the compensator 240 may compensate for the degradation of the first color sub-pixels displaying the first color R of the 3-1st pixels based on the first stress data SD1 for the first color R and the 3-1st stress data SD3-1 for the first color R. For example, the compensator 240 may compensate for the degradation of the second color sub-pixels displaying the second color G of the 3-1st pixels based on the first stress data SD1 for the second color G and the 3-1st stress data SD3-1 for the second color G. For example, the compensator 240 may compensate for the degradation of the third color sub-pixels displaying the third color B of the 3-1st pixels based on the first stress data SD1 for the third color B and the 3-1st stress data SD3-1 for the third color B.

For example, the compensator 240 may compensate for the degradation of the first color sub-pixels displaying the first color R of the 3-2th pixels based on the first stress data SD1 for the first color R and the 3-2th stress data SD3-2 for the first color R. For example, the compensator 240 may compensate for the degradation of the second color sub-pixels displaying the second color G of the 3-2th pixels based on the first stress data SD1 for the second color G and the 3-2th stress data SD3-2 for the second color G. For example, the compensator 240 may compensate for the degradation of the third color sub-pixels displaying the third color B of the 3-2th pixels based on the first stress data SD1 for the third color B and the 3-2th stress data SD3-2 for the third color B.

Figure 16:
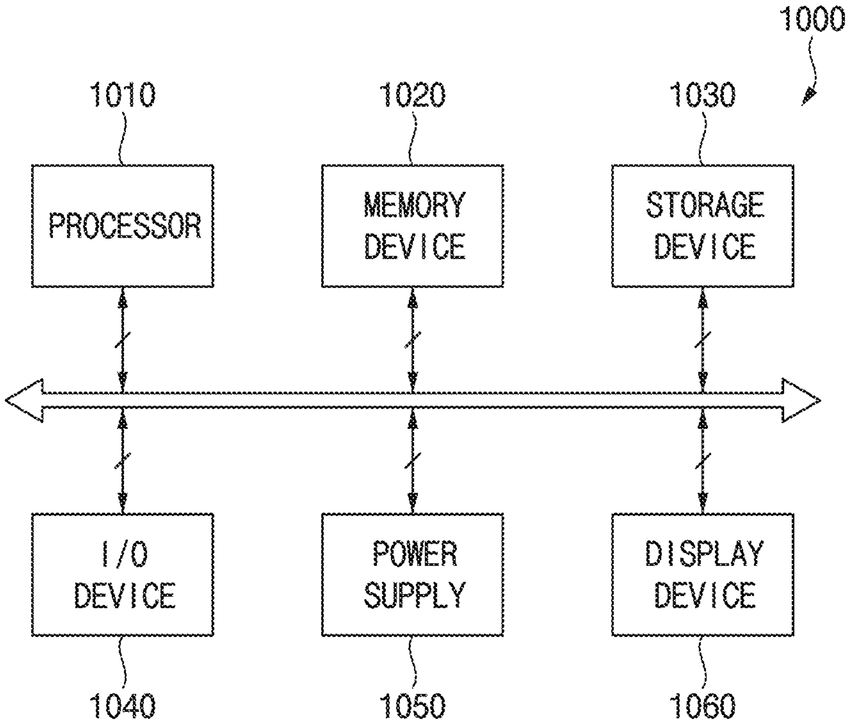
FIG. 16 is a block diagram showing an electronic device according to embodiments of the present invention.
Figure 17:
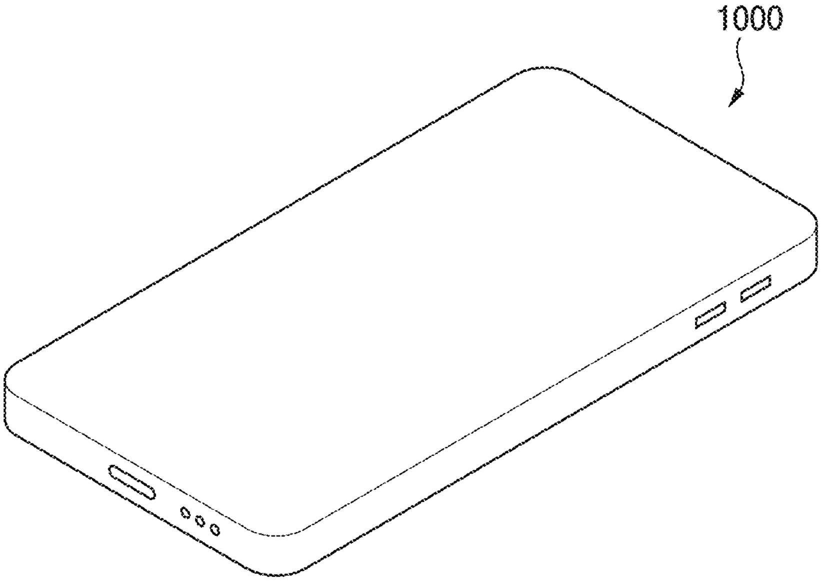
FIG. 17 is a diagram showing an example in which the electronic device of FIG. 16 is implemented as a smart phone.

FIG. 16 is a block diagram showing an electronic device according to embodiments of the present invention, and FIG. 17 is a diagram showing an example in which the electronic device of FIG. 16 is implemented as a smart phone.

Referring to FIGS. 11 and 12, the electronic device 1000 may include a processor 1010, a memory device 1020, a storage device 1030, an input/output ("I/O") device 1040, a power supply 1050, and a display device 1060. Here, the display device 1060 may be the display device of FIG. 1. In addition, the electronic device 1000 may further include a plurality of ports for communicating with a video card, a sound card, a memory card, a universal serial bus ("USB") device, other electronic devices, etc. In an embodiment, as shown in FIG. 17, the electronic device 1000 may be implemented as a smart phone. However, the electronic device 1000 is not limited thereto. For example, the electronic device 1000 may be implemented as a cellular phone, a video phone, a smart pad, a smart watch, a tablet PC, a car navigation system, a computer monitor, a laptop, a head mounted display ("HMD") device, etc.

The processor 1010 may perform various computing functions. The processor 1010 may be a microprocessor, a central processing unit ("CPU"), an application processor ("AP"), etc. The processor 1010 may be coupled to other components via an address bus, a control bus, a data bus, etc. Further, the processor 1010 may be coupled to an extended bus such as a peripheral component interconnection ("PCI") bus.

The memory device 1020 may store data for operations of the electronic device 1000. For example, the memory device 1020 may include at least one nonvolatile memory device such as an erasable programmable read-only memory ("EPROM") device, an electrically erasable programmable read-only memory ("EEPROM") device, a flash memory device, a phase change random access memory ("PRAM") device, a resistance random access memory ("RRAM") device, a nano floating gate memory ("NFGM") device, a polymer random access memory ("PoRAM") device, a magnetic random access memory ("MRAM") device, a ferroelectric random access memory ("FRAM") device, etc., and/or at least one volatile memory device such as a dynamic random access memory ("DRAM") device, a static random access memory ("SRAM") device, a mobile DRAM device, etc.

The storage device 1030 may include a solid state drive ("SSD") device, a hard disk drive ("HDD") device, a CD-ROM device, etc.

The I/O device 1040 may include an input device such as a keyboard, a keypad, a mouse device, a touch pad, a touch screen, etc., and an output device such as a printer, a speaker, etc. In some embodiments, the I/O device 1040 may include the display device 1060.

The power supply 1050 may provide power for operations of the electronic device 1000. For example, the power supply 1050 may be a power management integrated circuit ("PMIC").

The display device 1060 may display an image corresponding to visual information of the electronic device 1000. For example, the display device 1060 may be an organic light emitting display device or a quantum dot light emitting display device, but is not limited thereto. The display device 1060 may be coupled to other components via the buses or other communication links. Here, the display device 1060 may compensate for relative degradation of the second display region to the first display region. Accordingly, display quality of the display device may be enhanced.

The inventions may be applied to any electronic device including the display device. For example, the inventions may be applied to a television ("TV"), a digital TV, a 3D TV, a mobile phone, a smart phone, a tablet computer, a virtual reality ("VR") device, a wearable electronic device, a personal computer ("PC"), a home appliance, a laptop computer, a personal digital assistant ("PDA"), a portable multimedia player ("PMP"), a digital camera, a music player, a portable game console, a navigation device, etc.

The foregoing is illustrative of the present invention and is not to be construed as limiting thereof. Although a few exemplary embodiments of the present invention have been described, those skilled in the art will readily appreciate that many modifications are possible in the exemplary embodiments without materially departing from the novel teachings and advantages of the present invention. Accordingly, all such modifications are intended to be included within the scope of the present invention as defined in the claims. In the claims, means-plus-function clauses are intended to cover the structures described herein as performing the recited function and not only structural equivalents but also equivalent structures. Therefore, it is to be understood that the foregoing is illustrative of the present invention and is not to be construed as limited to the specific exemplary embodiments disclosed, and that modifications to the disclosed exemplary embodiments, as well as other exemplary embodiments, are intended to be included within the scope of the appended claims. The present invention is defined by the following claims, with equivalents of the claims to be included therein.

What is claimed is:

1. A method of compensating for degradation of a display device comprising:

determining a reference region including a second display region and a part of a first display region having a pixel structure different from a pixel structure of the second display region;

determining first stress data of first pixels based on a first average luminance value of the first pixels disposed on the part of the first display region;

determining second stress data of second pixels based on a second average luminance value of the second pixels disposed on a central region of the second display region;

determining third stress data of third pixels based on a third average luminance value of the third pixels disposed on an outer region, surrounding the central region, of the second display region;

compensating for degradation of the second pixels based on the first stress data and the second stress data; and compensating for degradation of the third pixels based on the first stress data and the third stress data.

2. The method of claim 1, wherein an optical module is disposed under the second display region, and a number of pixels per unit area of the pixel structure of the second display region is smaller than a number of pixels per unit area of the first display region.

3. The method of claim 1, further comprising:

assigning a first value to the first pixels;

assigning a second value different from the first value to the second pixels; and assigning a third value different from the first value and the second value to the third pixels, wherein the first pixels, the second pixels, and the third pixels are distinguished by assigned values.

4. The method of claim 3, wherein the first value, the second value, and the third value are assigned as a bit flag.

5. The method of claim 1, wherein the first stress data is determined based on a product of the first average luminance value and a first stress acceleration coefficient, wherein the second stress data is determined based on a product of the second average luminance value and a second stress acceleration coefficient different from the first stress acceleration coefficient, and wherein the third stress data is determined based on a product of the third average luminance value and a third stress acceleration coefficient different from the first stress acceleration coefficient.

6. The method of claim 1, further comprising:

accumulating the first stress data to generate first accumulated stress data;

accumulating the second stress data to generate second accumulated stress data; and accumulating the third stress data to generate third accumulated stress data, wherein the degradation of the second pixels is compensated based on the first accumulated stress data and the second accumulated stress data, and wherein the degradation of the third pixels is compensated based on the first accumulated stress data and the third accumulated stress data.

7. The method of claim 6, wherein the degradation of the second pixels is compensated by a difference between the first accumulated stress data and the second accumulated stress data, and wherein the degradation of the third pixels is compensated by a difference between the first accumulated stress data and the third accumulated stress data.

8. The method of claim 6, wherein the first accumulated stress data, the second accumulated stress data, and the third accumulated stress data are stored in a nonvolatile memory device.

9. The method of claim 6, wherein the degradation of the second pixels is compensated by reducing luminance of the second pixels when the second accumulated stress data is less than the first accumulated stress data, and wherein the degradation of the third pixels is compensated by reducing luminance of the third pixels when the third accumulated stress data is less than the first accumulated stress data.

10. The method of claim 1, wherein determining the first stress data comprises:

determining the first stress data for a first color based on the first average luminance value for the first color;

determining the first stress data for a second color based on the first average luminance value for the second color; and determining the first stress data for a third color based on the first average luminance value for the third color, wherein determining the second stress data comprises:

determining the second stress data for the first color based on the second average luminance value for the first color;

determining the second stress data for the second color based on the second average luminance value for the second color; and determining the second stress data for the third color based on the second average luminance value for the third color, and wherein determining the third stress data comprises:

determining the third stress data for the first color based on the third average luminance value for the first color;

determining the third stress data for the second color based on the third average luminance value for the second color; and determining the third stress data for the third color based on the third average luminance value for the third color.

11. The method of claim 10, wherein compensating for the degradation of the second pixels comprises:

compensating for degradation of first color sub-pixels, configured to display the first color, of the second pixels based on the first stress data for the first color and the second stress data for the first color;

compensating for degradation of second color sub-pixels, configured to display the second color, of the second pixels based on the first stress data for the second color and the second stress data for the second color; and compensating for degradation of third color sub-pixels, configured to display the third color, of the second pixels based on the first stress data for the third color and the second stress data for the third color.

12. The method of claim 10, wherein compensating for the degradation of the third pixels comprises:

compensating for degradation of first color sub-pixels, configured to display the first color, of the third pixels based on the first stress data for the first color and the third stress data for the first color;

compensating for degradation of second color sub-pixels, configured to display the second color, of the third pixels based on the first stress data for the second color and the third stress data for the second color; and compensating for degradation of third color sub-pixels, configured to display the third color, of the third pixels based on the first stress data for the third color and the third stress data for the third color.

13. The method of claim 10, further comprising:

accumulating the first stress data for the first color to generate first accumulated stress data for the first color;

accumulating the first stress data for the second color to generate the first accumulated stress data for the second color;

accumulating the first stress data for the third color to generate the first accumulated stress data for the third color;

determining a luminance maintenance ratio for the first color of the first pixels based on the first accumulated stress data for the first color;

determining the luminance maintenance ratio for the second color of the first pixels based on the first accumulated stress data for the second color;

determining the luminance maintenance ratio for the third color of the first pixels based on the first accumulated stress data for the third color; and compensating for a difference in degradation between the first color, the second color, and the third color in the first display region and the second display region based on the luminance maintenance ratio for the first color, the luminance maintenance ratio for the second color, and the luminance maintenance ratio for the third color.

14. The method of claim 13, compensating for the difference in the degradation between the first color, the second color, and the third color comprises:

determining a reference color among the first color, the second color, and the third color; and applying scale values determined based on the luminance maintenance ratio for the reference color to colors other than the reference color.

15. The method of claim 14, wherein the reference color is determined as a color having a smallest luminance maintenance ratio among the first color, the second color, and the third color.

16. The method of claim 14, wherein each of the scale values is calculated by dividing the luminance maintenance ratio for the reference color by the luminance maintenance ratio for each of the colors other than the reference color.

17. A method of compensating for degradation of a display device comprising:

determining a reference region including a second display region and a part of a first display region having a pixel structure different from a pixel structure of the second display region;

determining first stress data of first pixels based on a first average luminance value of the first pixels disposed on the part of the first display region;

determining second stress data of second pixels based on a second average luminance value of the second pixels disposed on a central region of the second display region;

determining 3-1st stress data of 3-1st pixels based on a 3-1st average luminance value of the 3-1st pixels disposed on an first outer region of an outer region, surrounding the central region, of the second display region;

determining 3-2th stress data of 3-2th pixels based on a 3-2th average luminance value of the 3-2th pixels disposed on an second outer region of the outer region of the second display region, wherein the second outer region is different from the first outer region;

compensating for degradation of the second pixels based on the first stress data and the second stress data;

compensating for degradation of the 3-1st pixels based on the first stress data and the 3-1st stress data; and compensating for degradation of the 3-2th pixels based on the first stress data and the 3-2th stress data.

18. The method of claim 17, further comprising:

assigning a first value to the first pixels;

assigning a second value different from the first value to the second pixels;

assigning a third value different from the first value and the second value to the 3-1st pixels; and assigning a fourth value different from the first value, the second value, and the third value to the 3-2th pixels, wherein the first pixels, the second pixels, the 3-1st pixels, and the 3-2th pixels are distinguished by assigned values.

19. The method of claim 17, further comprising:

accumulating the first stress data to generate first accumulated stress data;

accumulating the second stress data to generate second accumulated stress data;

accumulating the 3-1st stress data to generate 3-1st accumulated stress data; and accumulating the 3-2th stress data to generate 3-2th accumulated stress data, wherein the degradation of the second pixels is compensated based on the first accumulated stress data and the second accumulated stress data, wherein the degradation of the 3-1st pixels is compensated based on the first accumulated stress data and the 3-1st accumulated stress data, and wherein the degradation of the 3-2th pixels is compensated based on the first accumulated stress data and the 3-2th accumulated stress data.

20. A display device comprising:

a display panel including pixels;

a data driver configured to provide data voltages to the pixels;

a gate driver configured to provide gate signals to the pixels; and a timing controller configured to control the data driver and the gate driver, wherein the timing controller is configured to determine first stress data of first pixels based on a first average luminance value of the first pixels disposed on a part of the first display region included in a reference region, to determine second stress data of second pixels based on a second average luminance value of the second pixels disposed on a central region of a second display region, to determine third stress data of third pixels based on a third average luminance value of the third pixels disposed on an outer region, surrounding the central region, of the second display region, to compensate for degradation of the second pixels based on the first stress data and the second stress data, and to compensate for degradation of the third pixels based on the first stress data and the third stress data, wherein the second display region has a pixel structure different from a pixel structure of the first display region and is included in the reference region.

* * * * *